(12) United States Patent
Tamekuni et al.

(10) Patent No.: US 8,690,454 B2
(45) Date of Patent: Apr. 8, 2014

(54) OPTICAL CONNECTOR

(75) Inventors: Yoshikyo Tamekuni, Yokohama (JP); Yuji Suzuki, Yokohama (JP); Yukihiro Yokomachi, Yokohama (JP)

(73) Assignees: SEI Optifrontier Co., Ltd., Yokohama-shi, Kanagawa (JP); Sumitomo Electric Industries, Ltd., Osaka-shi, Osaka (JP)

( * ) Notice: Subject to any disclaimer, the term of this patent is extended or adjusted under 35 U.S.C. 154(b) by 30 days.

(21) Appl. No.: 13/503,755

(22) PCT Filed: Oct. 6, 2010

(86) PCT No.: PCT/JP2010/067520
§ 371 (c)(1),
(2), (4) Date: May 15, 2012

(87) PCT Pub. No.: WO2011/052352
PCT Pub. Date: May 5, 2011

(65) Prior Publication Data
US 2012/0243832 A1  Sep. 27, 2012

(30) Foreign Application Priority Data

Oct. 28, 2009 (JP) .............................. P2009-248029
Jun. 3, 2010 (JP) .............................. P2010-127938

(51) Int. Cl.
*G02B 6/38* (2006.01)
(52) U.S. Cl.
USPC .................... 385/60; 385/69; 385/95; 385/99

(58) Field of Classification Search
USPC ........... 385/56, 58, 60, 69, 72, 75–78, 95–99, 385/147
See application file for complete search history.

(56) References Cited

U.S. PATENT DOCUMENTS 8,496,384 B2 * 7/2013 Kuffel et al. .................... 385/60

FOREIGN PATENT DOCUMENTS

| CN | 201007747 Y | 1/2008 |
|---|---|---|
| CN | 201152902 Y | 11/2008 |
| JP | 9-61667 | 3/1997 |
| JP | 3138620 | 2/2001 |
| JP | 2008-197622 | 8/2008 |
| JP | 2009-104069 | 5/2009 |
| JP | 2009-109978 | 5/2009 |
| JP | 2009-205100 | 9/2009 |
| WO | WO 2009/107306 | 9/2009 |

* cited by examiner

*Primary Examiner* — Uyen Chau N Le
*Assistant Examiner* — Michael Mooney
(74) *Attorney, Agent, or Firm* — Drinker Biddle & Reath LLP

(57) ABSTRACT

The optical connector in accordance with an embodiment comprises a ferrule for holding a built-in fiber to be coupled to a coated optical fiber of an optical cord, a first housing for containing the ferrule, a second housing arranged behind the first housing, and a sheath pressing member and a securing member which are mounted to the second housing. The sheath pressing member presses a sheath of the optical cord against the second housing. The securing member secures a tension fiber of the optical cord to the second housing so as to contain the sheath pressing member.

5 Claims, 24 Drawing Sheets

Fig.8
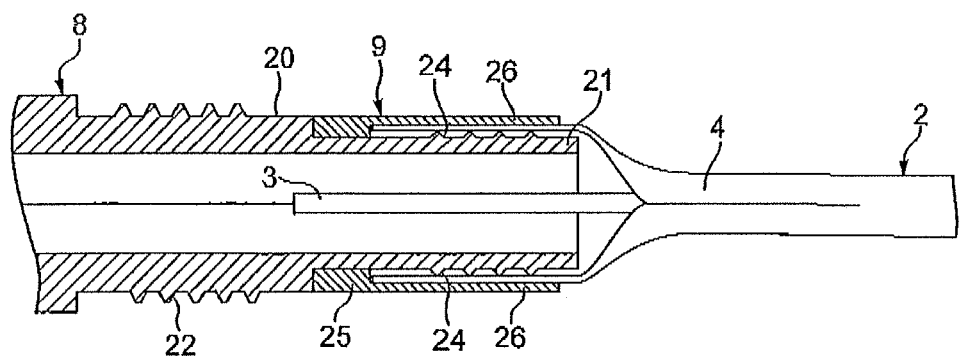
(a)
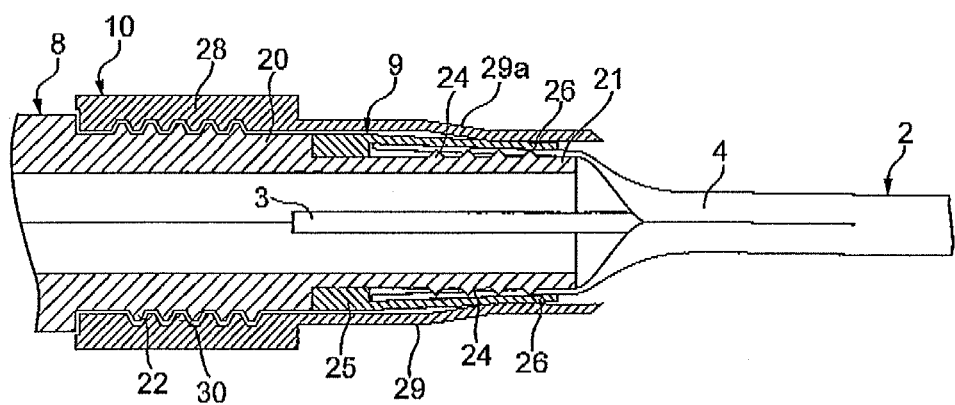
(b)

OPTICAL CONNECTOR

TECHNICAL FIELD

The present invention relates to an optical connector to which an optical cord having a sheath and a tension fiber is assembled.

BACKGROUND ART

As a conventional optical connector, one disclosed in Patent Literature 1 has been known, for example. The optical connector disclosed in Patent Literature 1 comprises a connector ferrule having a short optical fiber attached thereto, a plug frame containing the connector ferrule, a protection sleeve covering a fusion-spliced portion between the short optical fiber and an optical fiber of an optical cord, a rear housing engaging the plug frame and covering the protection sleeve, and a boot fitting to the rear end portion of the rear housing and protecting the optical cord. The sheath and tension fiber (Kevlar) of the optical cord is crimped and secured to the rear end of the rear housing by a caulking ring.

CITATION LIST

Patent Literature

Patent Literature 1: Japanese Patent Application Laid-Open No. 2008-197622

SUMMARY OF INVENTION

Technical Problem

However, the above-mentioned prior art secures the sheath and tension fiber of the optical cord by the caulking ring and thus necessitates a caulking tool. Therefore, when the optical connector is to be assembled not in a factory but on site, it must be made sure to bring the caulking tool to the site.

Hence, there is a demand for an optical connector which can secure the sheath and tension fiber of an optical cord to a housing without using additional tools.

Solution to Problem

The optical connector in accordance with one aspect of the present invention is an optical connector having a fiber-spliced portion connecting a built-in fiber held by a ferrule and an optical fiber exposed by removing a sheath of an optical cord to each other; the optical connector comprising a first housing for containing the ferrule and the fiber-spliced portion; a second housing arranged behind the first housing; a sheath pressing member, mounted to the second housing, for pressing the sheath of the optical cord against the second housing; and a securing member, mounted to the second housing so as to contain the sheath pressing member, for securing a tension fiber incorporated in the optical cord to the second housing together with the sheath. The first and second housings may define a space for containing the fiber-spliced portion.

When securing the sheath and tension fiber of the optical cord during assembly of thus constructed optical connector, after the sheath is removed from a leading end portion of the optical cord, the sheath pressing member is mounted to the second housing so as to press the sheath against the second housing. Then, in this state, the securing member is mounted to the second housing so as to contain the sheath pressing member therein, thereby securing the sheath and tension fiber of the optical cord to the second housing. Therefore, the sheath and tension fiber of the optical cord can be secured to the second housing without employing a caulking scheme necessitating a caulking tool in particular.

In one embodiment, the second housing may have a first tubular portion and a second tubular portion disposed behind the first tubular portion and having an outer diameter smaller than that of the first tubular portion; the sheath pressing member may have an annular portion adapted to fit to the second tubular portion and a pair of pressing arms, disposed so as to extend behind the annular portion, for pressing the sheath in a bifurcated state against the second tubular portion; and the securing member may have a tension fiber securing portion adapted to fit to the first tubular portion so as to hold and secure that the tension fiber with the first tubular portion and a sheath securing portion, disposed behind the tension fiber securing portion, for holding and securing the sheath in the bifurcated state with the second tubular portion via the pressing arms. The annular portion may fit to the second tubular portion such that the second tubular portion is located in an inner hole of the annular portion. The pressing arms may press the sheath against an outer peripheral face of the second annular portion. The securing member may be attached to an outer peripheral face of the first tubular portion, while the tension fiber securing portion may hold the tension fiber between the tension fiber securing portion and the first tubular portion. The sheath securing portion may press the pressing arms against the outer peripheral face of the second tubular portion, thereby holding the sheath between the sheath securing portion and the second tubular portion via the pressing arms.

In the embodiment, when securing the sheath and tension fiber of the optical cord to the second housing, the sheath of the optical cord is initially torn into a bifurcated state. Subsequently, the annular portion of the sheath pressing member is fitted to the second tubular portion of the second housing, whereby the sheath in the bifurcated state is pressed by a pair of pressing arms against the second tubular portion. Then, in this state, the tension fiber securing portion of the securing member is fitted to the first tubular portion of the second housing, so as to hold and secure the tension fiber of the optical cord between the tension fiber securing portion and the first tubular portion, while holding and securing the sheath in the bifurcated state between the sheath securing portion of the securing member and the second tubular portion via the pressing arms. Hence, the sheath and tension fiber of the optical cord can be secured to the second housing easily and reliably.

In one embodiment, the sheath securing portion may have a taper region tapering down to the rear side of the securing member.

In the embodiment, when the tension fiber securing portion of the securing member is fitted to the first tubular portion of the second housing, each of the pressing arms of the sheath pressing member follows the taper region of the sheath securing portion of the securing member to bend toward the second tubular portion. This can firmly secure the sheath in the bifurcated state to the second tubular portion.

In one embodiment, a front end portion of the second housing may be provided with a support projection for supporting at a plurality of locations a spring for forwardly urging the ferrule.

The spring for urging the ferrule is very small. This makes it difficult for operators to catch the spring with fingers, whereby the spring may drop during operations. The spring is likely to roll away and may be hard to find out when dropped.

Hence, supporting the spring with the support projection disposed at the front end portion of the second housing can prevent the operators from dropping and losing the spring by mistake during assembling the optical connector.

In one embodiment, the ferrule may include a flange having a vertically asymmetrical shape, while a ferrule accommodation space for containing the ferrule in the first housing may have a shape corresponding to the flange.

When the leading end face of the ferrule is angle-polished, for example, the vertical orientation of the ferrule with respect to the first housing is important in order to achieve connector coupling by butting the leading end faces of ferrules against each other. Hence, forming the flange portion of the ferrule into a vertically asymmetrical shape and forming the ferrule accommodation space of the first housing into a shape corresponding to the flange portion can make it easier to arrange the vertical orientation of the ferrule with respect to the first housing at the time of assembling the optical connector.

Advantageous Effects of Invention

In accordance with one aspect of the present invention, the sheath and tension fiber of an optical cord can be secured to a housing without using additional tools. This can spare the operators the trouble of preparing caulking tools and the like and bringing them to the site.

BRIEF DESCRIPTION OF DRAWINGS

FIG. 8 is a sectional view illustrating how the sheath and tension fiber of an optical cord are secured by the sheath pressing member and securing member depicted in FIG. 5;

DESCRIPTION OF EMBODIMENTS

In the following, preferred embodiments of the optical connector in accordance with the present invention will be explained in detail with reference to the drawings.

Figure 1:
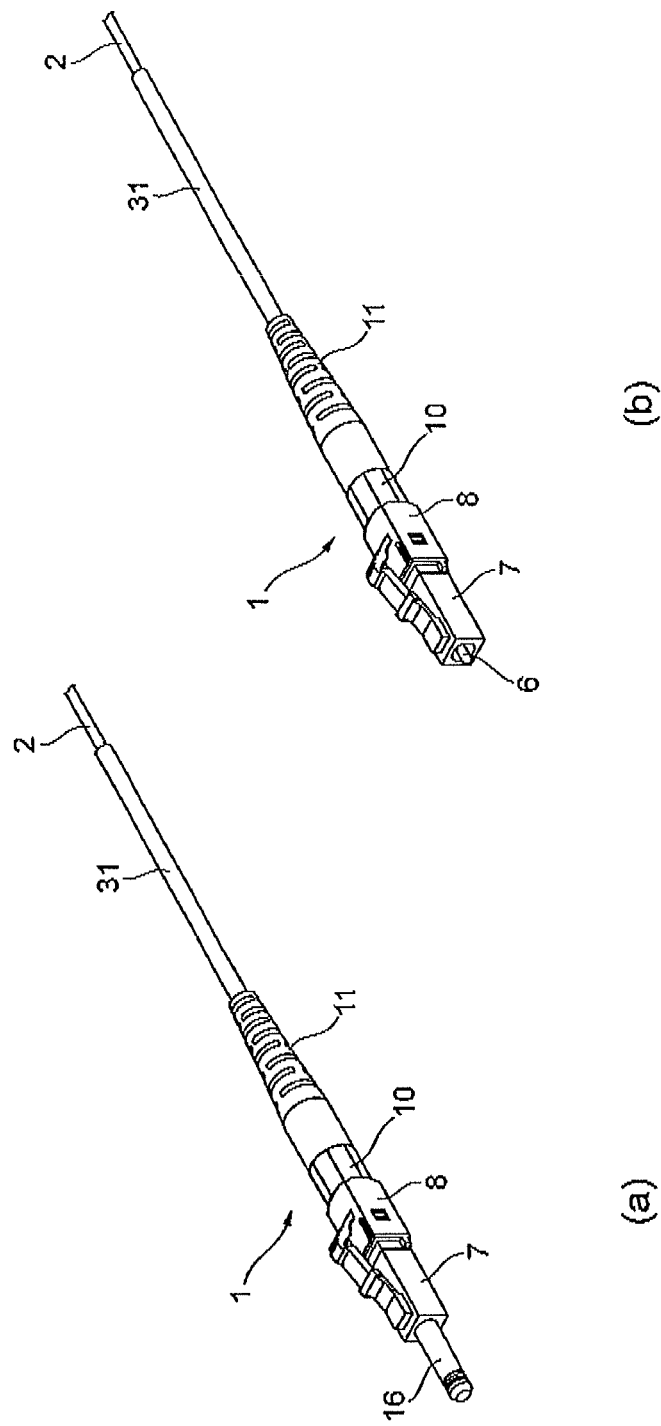
FIG. 1 is a perspective view illustrating one embodiment of the optical connector in accordance with the present invention.
Figure 2:
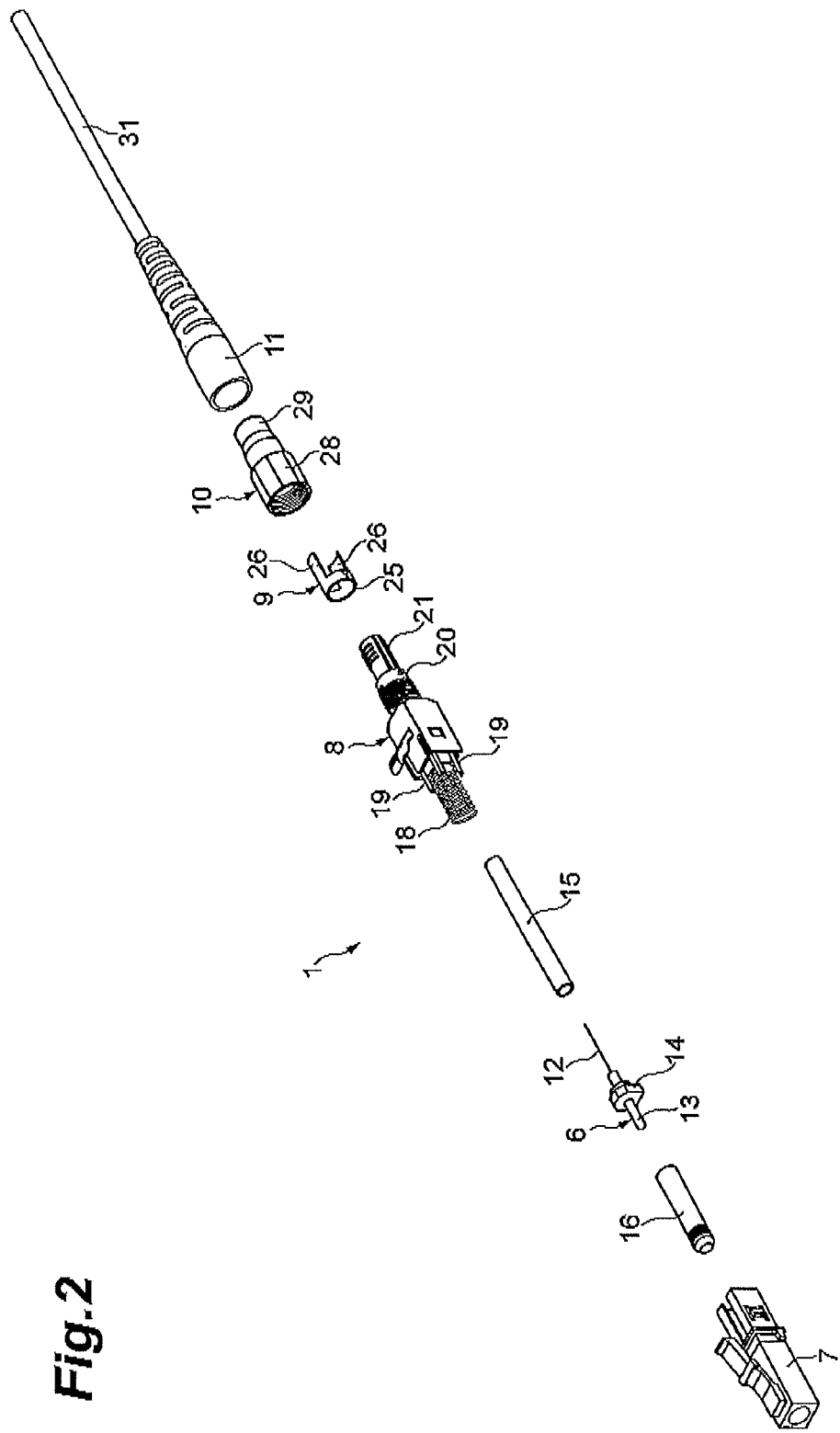
FIG. 2 is an exploded perspective view of the optical connector illustrated in (a) of FIG. 1.
Figure 3:
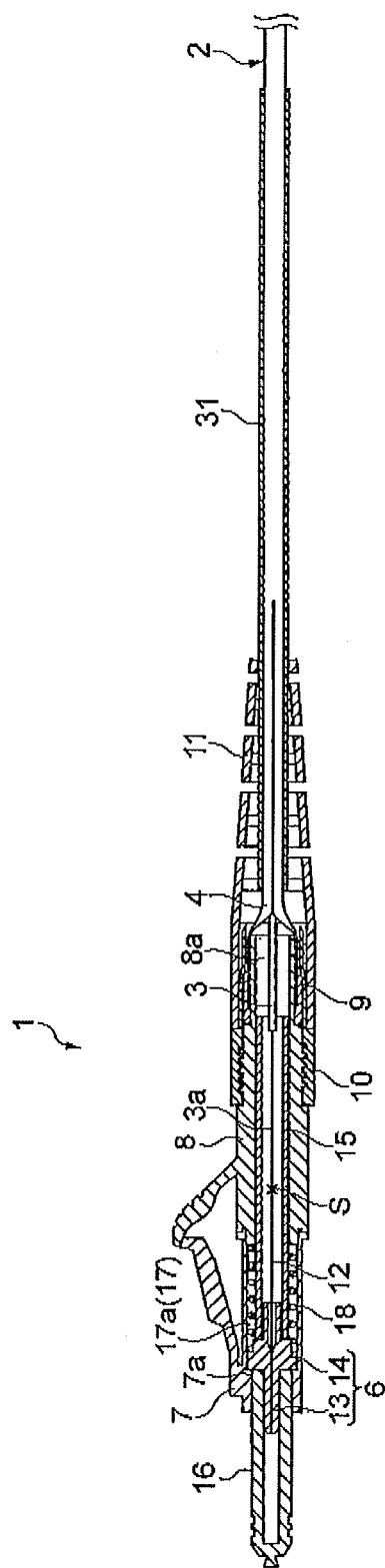
FIG. 3 is a sectional view of the optical connector illustrated in (a) of FIG. 1.

FIG. 1 is a perspective view illustrating one embodiment of the optical connector in accordance with the present invention. In FIG. 1, (a) and (b) illustrate the optical connector in the states with and without a dust cap, respectively. FIGS. 2 and 3 are exploded perspective and sectional views of the optical connector illustrated in (a) of FIG. 1, respectively. In this specification, "rear" is used as a term indicating a direction in which a rear housing, i.e., a second housing, is located with respect to a plug housing, i.e., a first housing. The vertical direction is used as a term for indicating a predetermined direction orthogonal to the front-back direction.

The optical connector 1 of the embodiment illustrated in FIGS. 1 to 3 is a fusion-spliced LC connector having an optical cord 2 assembled thereto. The optical cord 2 has a coated optical fiber 3, a sheath 4 covering the coated optical fiber 3, and a tension fiber (Kevlar) 5 having a very small diameter interposed between the coated optical fiber 3 and sheath 4. While being assembled in a bundle, the tension fiber 5 is incorporated in the optical cord 2 (see FIG. 9).

The optical connector 1 comprises a ferrule member 6, a plug housing 7 containing the ferrule member 6, a rear housing 8 arranged behind and joined to the plug housing 7, a sheath pressing member 9 and a securing member 10 which are mounted to the rear housing 8, and a boot 11 attached to the securing member 10.

The ferrule member 6 has a ferrule body 13 for holding a short built-in fiber 12, and a flange 14 secured to the ferrule body 13. The leading end face (front end face) of the ferrule body 13 is polished at a predetermined angle (e.g., 8°).

The built-in fiber 12 extends rearward from the ferrule member 6 by a predetermined length. The leading end of the coated optical fiber 3 exposed by removing the sheath 4 from a leading end portion of the optical cord 2 is fusion-spliced to one end, i.e., rear end, of the built-in fiber 12. The fusion-spliced portion S between the built-in fiber 12 and coated optical fiber 3 is protected by a fusion protection sleeve 15.

Figure 4:
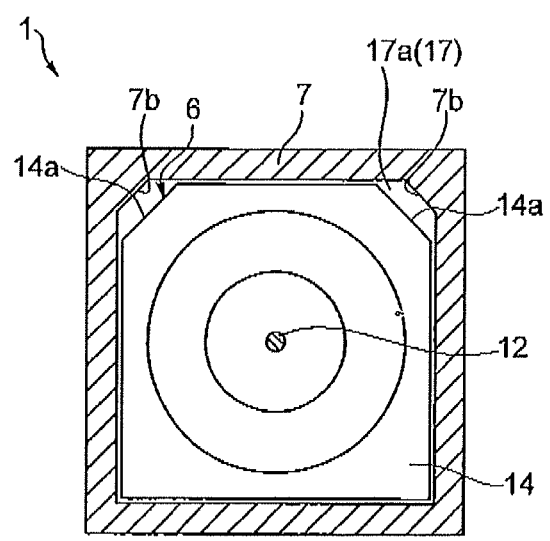
FIG. 4 is a sectional view illustrating a state in which a ferrule member depicted in FIG. 2 is contained in a plug housing.

The flange 14 has a substantially rectangular shape as illustrated in FIG. 4. Two corners on the upper or lower side of the flange 14 are formed with cutout surfaces 14a which are cut into flat or curved surfaces. Hence, the flange 14 has a vertically asymmetrical shape.

When the optical connector 1 is unused (not making connector coupling with its opposite optical connector), the ferrule body 13 is covered with a dust cap 16 for protecting the ferrule body 13 from dust, dirt, and the like (see (a) of FIG. 1). The dust cap 16 has a substantially cylindrical shape.

The plug housing 7 is formed with a penetration hole 17 extending in the front-back direction. The ferrule member 6 is contained in the plug housing 7 from the rear side thereof. The inner wall face in a front-side portion of the plug housing 7 is provided with a wall portion 7a for receiving the flange 14 of the ferrule member 6. A region extending from the rear end of the plug housing 7 to the wall portion 7a in the penetration hole 17 forms a ferrule accommodation space 17a for containing the ferrule member 6.

The diameter of the penetration hole 17 in the front-side portion of the housing 7 (the region corresponding to the wall portion 7a) is slightly greater than the outer diameter of the dust cap 16. The size of the ferrule accommodation space 17a is greater than the diameter of the penetration hole 17 in the front-side portion of the housing 7. This allows the dust cap 16 to pass throughout the penetration hole 17.

As illustrated in FIG. 4, the cross section of the ferrule accommodation space 17a orthogonal to the front-back direction is a substantially rectangular shape corresponding to the shape of the flange 14 of the ferrule member 6. That is, the corners in the upper portion of the inner walls of the plug housing 7 forming the ferrule accommodation space 17a are formed with two tilted surfaces 7b corresponding to the cut-out surfaces 14a of the flange 14. This unconditionally determines the vertical orientation of the ferrule member 6 with respect to the plug housing 7 when containing the ferrule member 6 in the plug housing 7. Therefore, the vertical orientation of the ferrule member 6 with respect to the plug housing 7 is not mistaken when butting the leading end faces of ferrule members 6 against each other at the time of connector coupling with an opposite optical connector.

The rear housing 8 is joined to a rear end portion of the plug housing 7 through engaging means. The rear housing 8 is formed with a penetration hole 8a extending in the front-back direction. The fusion protection sleeve 15 is contained in the plug housing 7 and rear housing 8.

Figure 5:
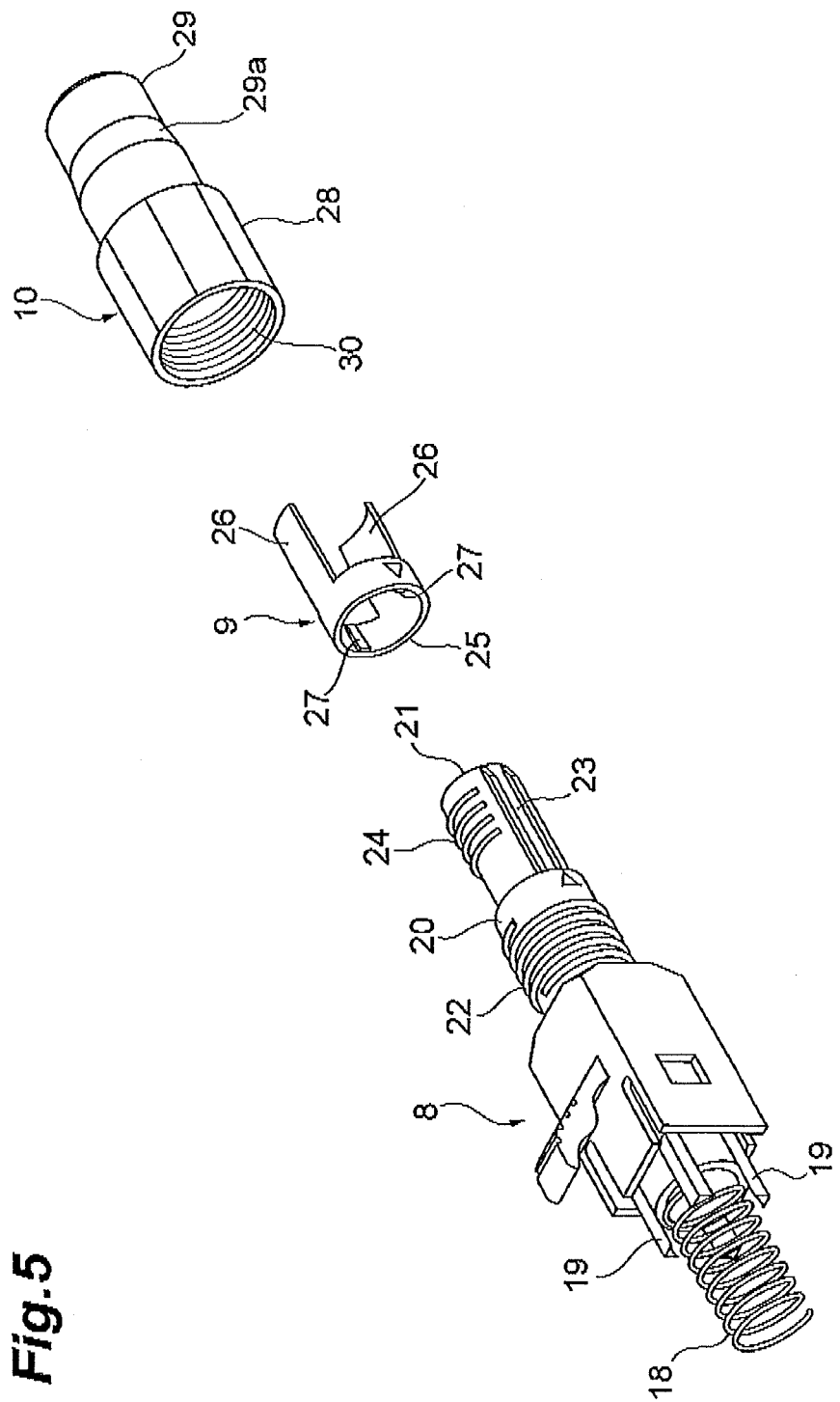
FIG. 5 is an exploded perspective view of a sprung rear housing, a sheath pressing member, and a securing member which are illustrated in FIG. 1.

As illustrated in FIG. 5, a front end portion of the rear housing 8 is provided with four support projections 19 for supporting a spring 18 which forwardly urges the ferrule member 6. The spring 18 is arranged in the ferrule accommodation space 17a of the plug housing 7. Providing such a spring 18 makes it possible to establish PC (Physical Contact) with an opposite optical connector.

Figure 6:
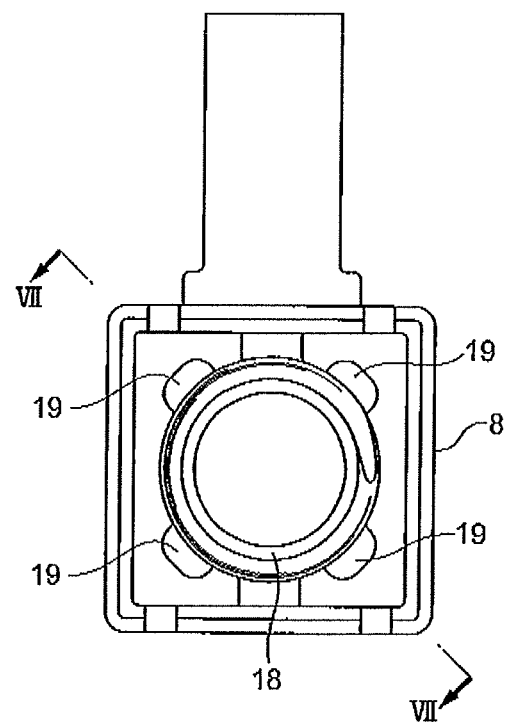
FIG. 6 is a front view of the sprung rear housing illustrated in FIG. 5.
Figure 7:
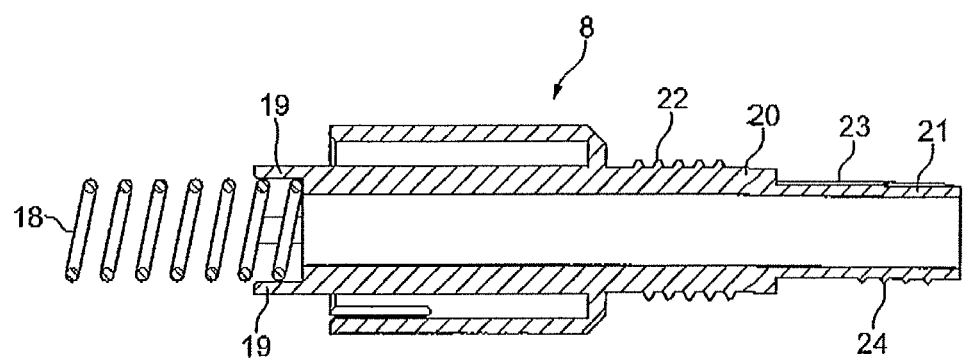
FIG. 7 is a sectional view taken along the line VII-VII of FIG. 6.

As illustrated in FIGS. 5 to 7, the support projections 19 are intermittently disposed at equally-spaced intervals in the circumferential direction while projecting forwardly from the rear housing 8. That is, the four support projections 19 can be provided at equally-spaced intervals about the center axis of the ferrule body 13 or the center axis of the built-in fiber 12. This structure allows the spring 18 to come into contact with inner wall faces of opposing two support projections 19 among the four support projections 19, for example, so as to be supported by the front end portion of the rear housing 8 easily and reliably. The number of support projections 19 is not limited to 4 in particular as long as the spring 18 is supported at a plurality of locations.

The rear housing 8 has a larger tubular portion 20 and a smaller tubular portion 21 disposed behind the larger tubular portion 20. The smaller tubular portion 21 has a diameter smaller than that of the larger tubular portion 20. The outer peripheral face of the larger tubular portion 20 is formed with a male thread 22.

The outer peripheral face of the smaller tubular portion 21 is formed with a pair of guide rails 23 extending in the front-back direction for guiding the sheath pressing member 9. In addition, the outer peripheral face of the smaller tubular portion 21 is formed with a pair of blades 24 for securing the sheath 4 of the optical cord 2. Each of the blades 24 may include at least one protrusion. The blades 24 are formed in regions between the pair of guide rails 23 on the outer peripheral face of the smaller tubular portion 21.

The sheath pressing member 9 and securing member 10 are mounted to thus constructed rear housing 8. The sheath pressing member 9 has an annular portion 25 adapted to fit onto the smaller tubular portion 21 and a pair of pressing arms 26, integrated with the annular portion 25, extending axially of the annular portion 25. The annular portion 25 can fit onto the smaller tubular portion 21 such that the smaller tubular portion 21 is located in the inner hole of the annular portion 25. Each of the pair of pressing arms 26 has a front end connected to the annular portion 25, and a rear end of each of the pair of pressing arms 26 may be a free end. The inner peripheral face of the annular portion 25 is formed with a pair of protrusions 27 adapted to engage their corresponding guide rails 23 of the smaller tubular portion 21. The protrusions 27 are formed in regions between the arms 26 on the inner peripheral face of the annular portion 25.

The securing member 10 has a substantially tubular shape. The securing member 10 has a tension fiber securing portion 28 for securing the tension fiber 5 (see FIG. 9) of the optical cord 2 to the larger tubular portion 20 of the rear housing 8 and a sheath securing portion 29, disposed behind the tension fiber securing portion 28, for securing the sheath 4 of the optical cord 2 to the smaller tubular portion 21 through the pressing arms 26.

The inner peripheral face of the tension fiber securing portion 28 is formed with a female thread 30 in mesh with the male thread 22 of the larger tubular portion 20. The tension fiber securing portion 28 can be attached to the outer peripheral face of the larger tubular portion 20. A predetermined clearance is provided between the male thread 22 and female thread 30 such that the larger tubular portion 20 and tension fiber securing portion 28 can hold the tension fiber 5 therebetween.

The sheath securing portion 29 has a taper region 29a tapering down to the rear side of the securing member 10. Therefore, the aperture diameter of the securing member 10 is smaller at the rear end than at the front end. Specifically, the aperture diameter at the rear end of the securing member 10 is smaller than the outer diameter of the sheath pressing member 9.

When securing the sheath 4 and tension fiber 5 of the optical cord 2 to the rear housing 8 by using thus constructed sheath pressing member 9 and securing member 10, the sheath 4 in the leading end portion of the optical cord 2 is initially torn into a bifurcated state as illustrated in (a) of FIG. 8. Then, the sheath 4 in the bifurcated state is mounted on the blades 24 of the smaller tubular portion 21 of the rear housing 8.

Subsequently, the sheath pressing member 9 is fitted onto the smaller tubular portion 21 such that the pressing arms 26 are located behind the annular portion 25. That is, the sheath pressing member 9 is engaged with the smaller tubular portion 21. Here, the annular portion 25 is fitted onto the smaller tubular portion 21 such that the protrusions 27 of the annular portion 25 extend along their corresponding guide rails 23 of the smaller tubular portion 21. This allows the blades 24 to bite into the sheath 4, thereby temporarily securing the sheath 4 to the smaller tubular portion 21.

Next, while the tension fiber 5 (not depicted) of the optical cord 2 is mounted on the larger tubular portion 20 of the rear housing 8, the tension fiber securing portion 28 of the securing member 10 is screwed on the larger tubular portion 20 as illustrated in (b) of FIG. 8. That is, the tension fiber securing portion 28 of the securing member 10 is attached to or threadably mounted on the larger tubular portion 20. Hence, the tension fiber, which is not depicted, is held and secured between the larger tubular portion 20 and tension fiber securing portion 28.

This also covers the smaller tubular portion 21 of the rear housing 8 with the sheath securing portion 29 of the securing member 10. Since the sheath securing portion 29 has the taper region 29a tapering down to the rear side of the securing member 10, the pressing arms 26 of the sheath pressing member 9 are pressed by the sheath securing portion 29 so as to bend toward the smaller tubular portion 21. As a consequence, the sheath 4 in the bifurcated state is held and secured between the sheath securing portion 29 and smaller tubular portion 21 through the pressing arms 26.

Returning to FIGS. 1 to 3, the boot 11 is mounted to the sheath securing portion 29. The boot 11 protects the optical cord 2 such that no drastic bend acts on the optical cord 2 behind the rear housing 8. The boot 11 has a reinforcement tube 31 attached thereto beforehand.

A procedure of assembling thus constructed optical connector 1 will now be explained. First, as illustrated in (a) of FIG. 9, the optical cord 2 is passed through the boot 11 having the reinforcement tube 31 attached thereto, the securing member 10, the sheath pressing member 9, and the rear housing 8 mounted with the spring 18.

Figure 9:
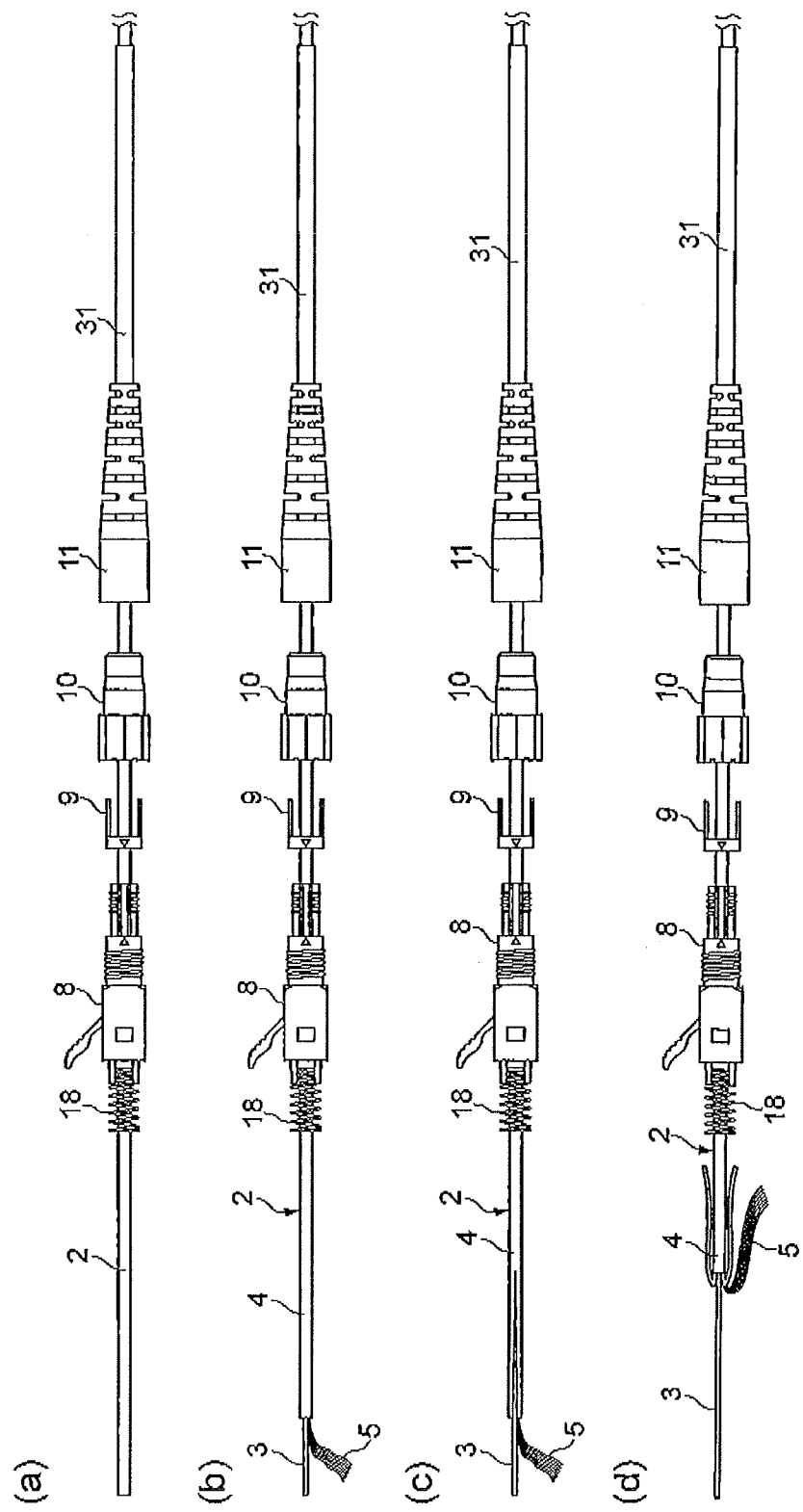
FIG. 9 is a diagram illustrating a procedure of assembling the optical connector depicted in (a) of FIG. 1.

Subsequently, as illustrated in (b) of FIG. 9, the sheath 4 is removed from a leading end portion of the optical cord 2, so as to expose the coated optical fiber 3 and tension fiber 5. Then, a superfluous portion of the tension fiber 5 is cut off. Next, as illustrated in (c) of FIG. 9, a leading end portion of the sheath 4 is torn into a bifurcated state. Thereafter, as illustrated in (d) of FIG. 9, the sheath 4 in the bifurcated state and the tension fiber 5 are folded back.

Figure 10:
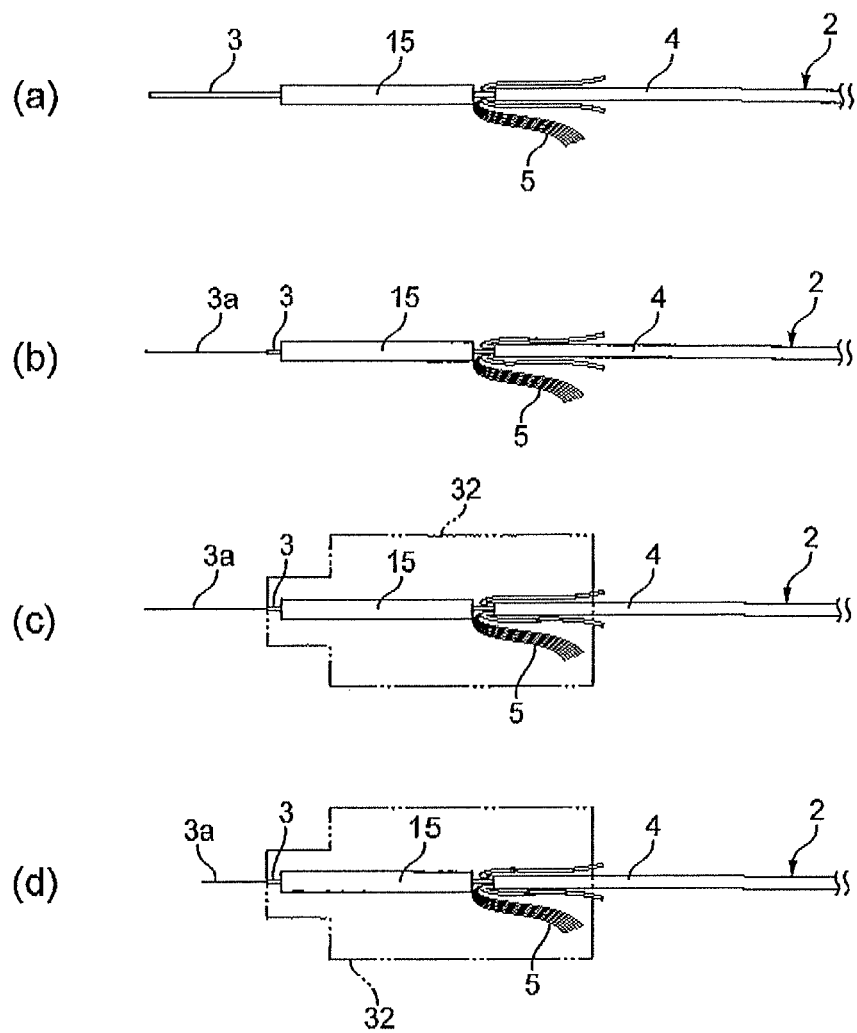
FIG. 10 is a diagram illustrating the procedure of assembling the optical connector depicted in (a) of FIG. 1.

Subsequently, as illustrated in (a) of FIG. 10, the coated optical fiber 3 is passed through the fusion protection sleeve 15. Thereafter, as illustrated in (b) of FIG. 10, the coating is removed from a leading end portion of the coated optical fiber 3, so as to expose a bare fiber 3a, which is then cleaned. Next, as illustrated in (c) of FIG. 10, the leading end portion of the optical cord 2 is set in a fusion fiber holder 32. Then, as illustrated in (d) of FIG. 10, a leading end portion of the bare fiber 3a is cut off. Thereafter, the fusion fiber holder 32 is set in a fusion splicer (not depicted).

Figure 11:
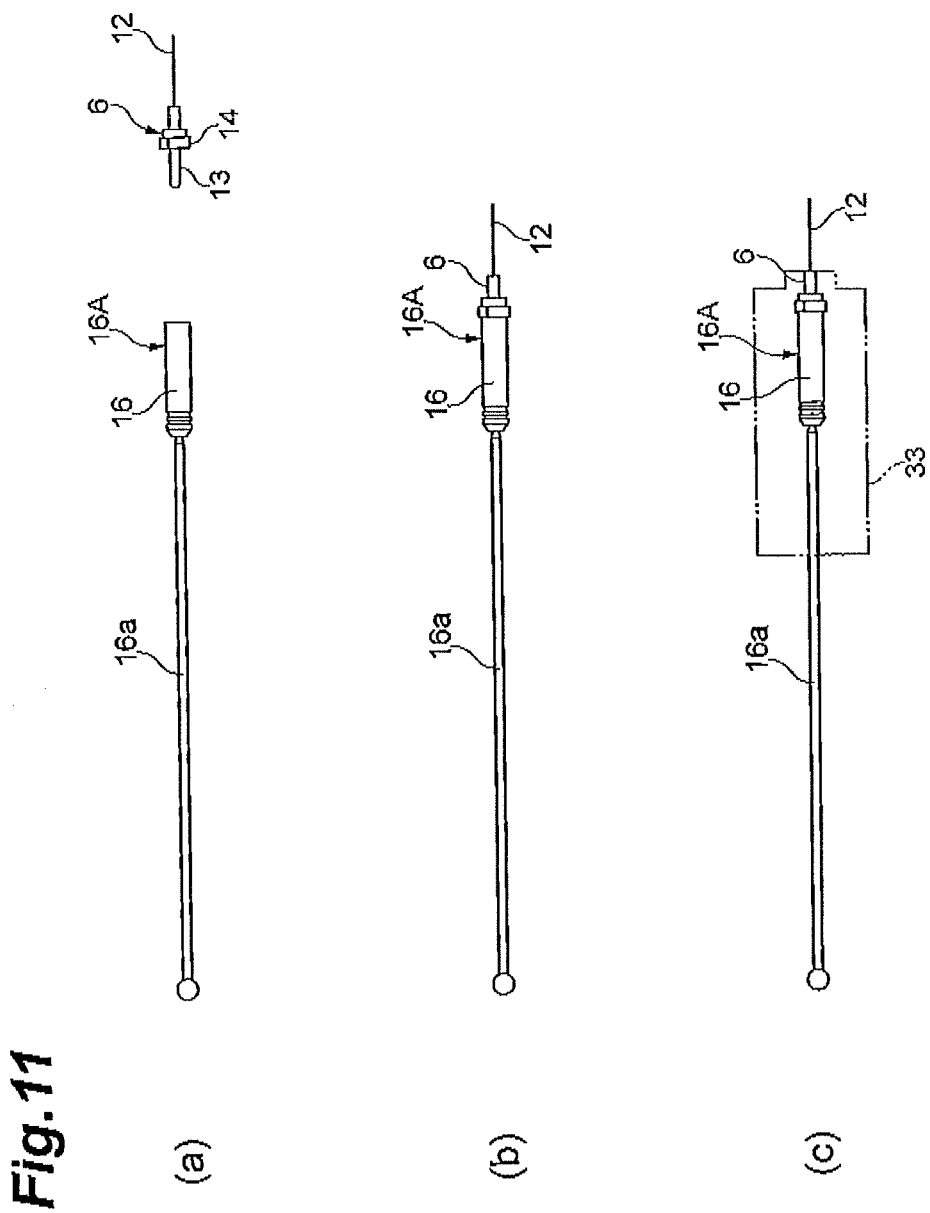
FIG. 11 is a diagram illustrating the procedure of assembling the optical connector depicted in (a) of FIG. 1.

In addition, as illustrated in (a) of FIG. 11, a string-attached dust cap 16A is prepared. The string-attached dust cap 16A is one having a string 16a attached to the leading end of the dust cap 16. Subsequently, as illustrated in (b) of FIG. 11, the ferrule body 13 of the ferrule member 6 holding the built-in fiber 12 is covered with the string-attached dust cap 16A. The ferrule body 13 is usually shipped in a state covered with the string-attached dust cap 16A from a factory in view of workability. Next, as illustrated in (c) of FIG. 11, the ferrule member 6 mounted with the string-attached dust cap 16A is set in the ferrule holder 33. Then, the ferrule holder 33 is set in a fusion splicer (not depicted).

Thereafter, the fusion splicer fusion-splices the leading end of the built-in fiber 12 and the leading end of the bare fiber 3a of the coated optical fiber 3 to each other.

Figure 12:
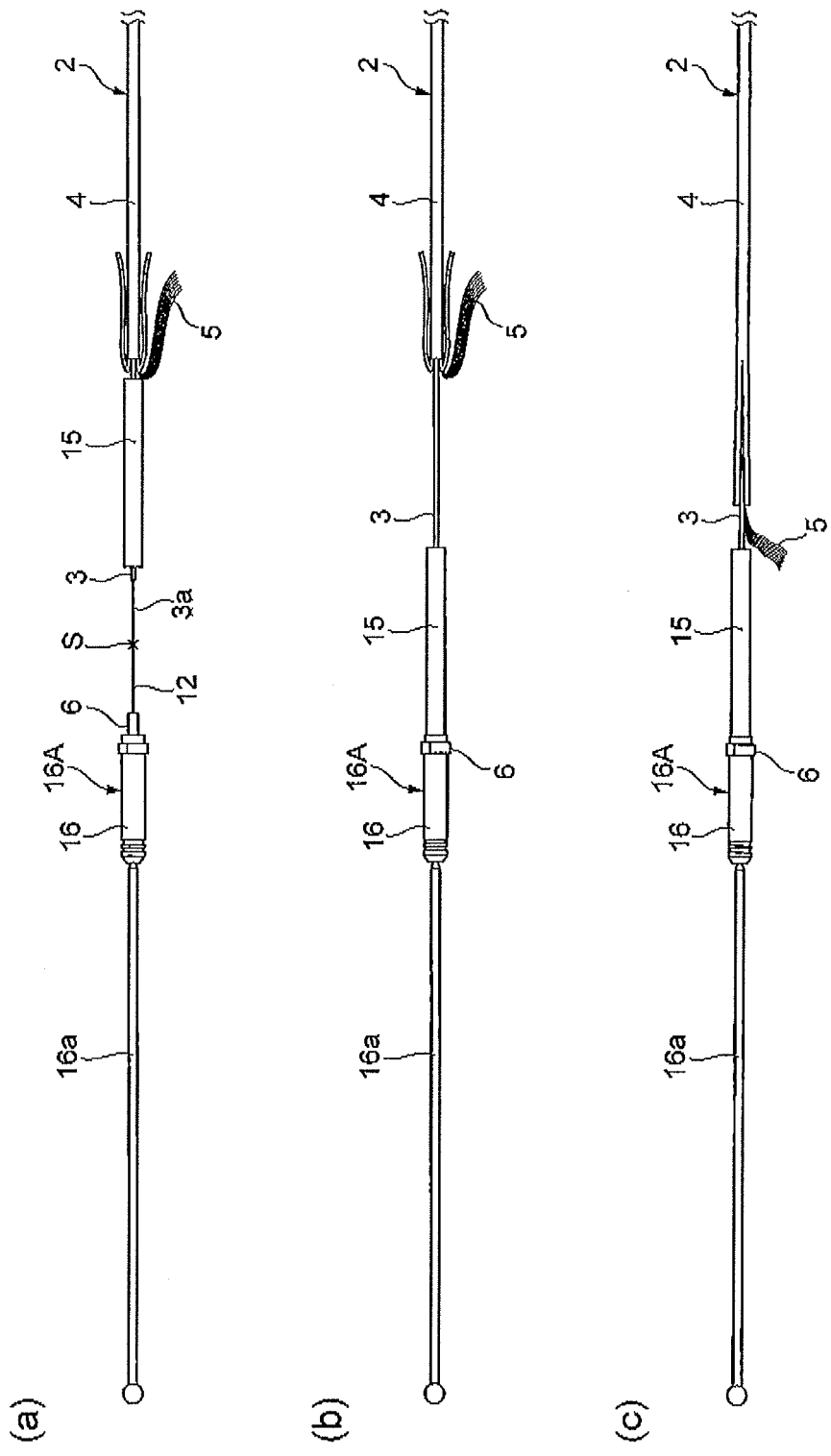
FIG. 12 is a diagram illustrating the procedure of assembling the optical connector depicted in (a) of FIG. 1.

Next, as illustrated in (a) of FIG. 12, the item (intermediate product) set in the fusion fiber holder 32 and ferrule holder 33 is taken out of the fusion splicer. Subsequently, as illustrated in (b) of FIG. 12, the fusion protection sleeve 15 is moved to the position of the fusion-spliced portion S between the built-in fiber 12 and coated optical fiber 3 and heat-shrunk in this state. This keeps the fusion protection sleeve 15 from shifting from the fusion-spliced portion S. Then, as illustrated in (c) of FIG. 12, the turned-back sheath 4 and tension fiber 5 are returned to their original states.

Figure 13:
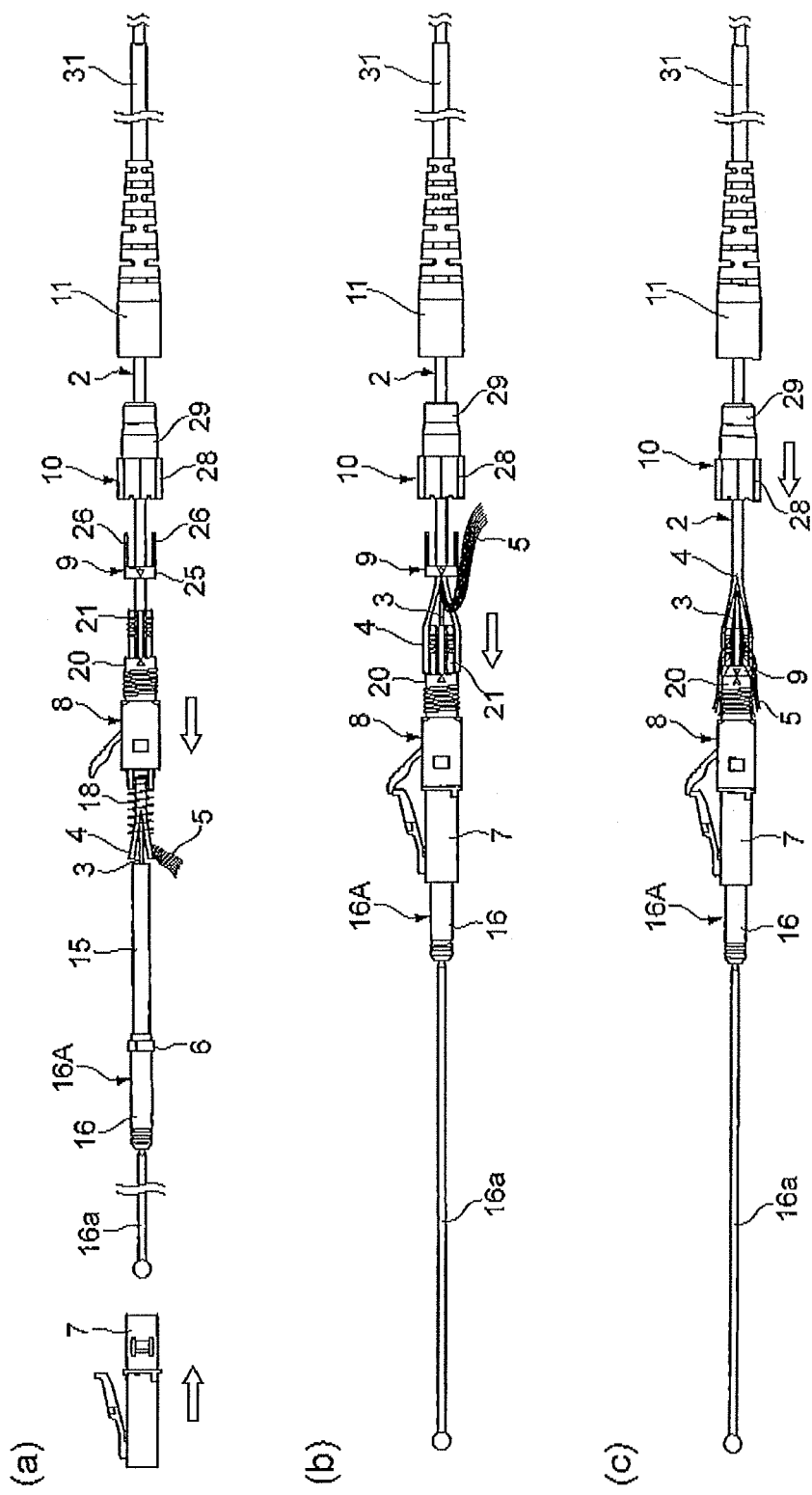
FIG. 13 is a diagram illustrating the procedure of assembling the optical connector depicted in (a) of FIG. 1.

Subsequently, as illustrated in (a) of FIG. 13, the plug housing 7 is prepared. Then, as illustrated in (b) of FIG. 13, the string-attached dust cap 16A is passed through the plug housing 7 to join the plug housing 7 to the rear housing 8. Thereafter, as illustrated in (c) of FIG. 13, the sheath pressing member 9 is fitted onto the smaller tubular portion 21 of the rear housing 8 while the sheath 4 in the bifurcated state is mounted on the smaller tubular portion 21 (as mentioned above in detail). That is, the sheath pressing member 9 is engaged with the smaller tubular portion 21.

Figure 14:
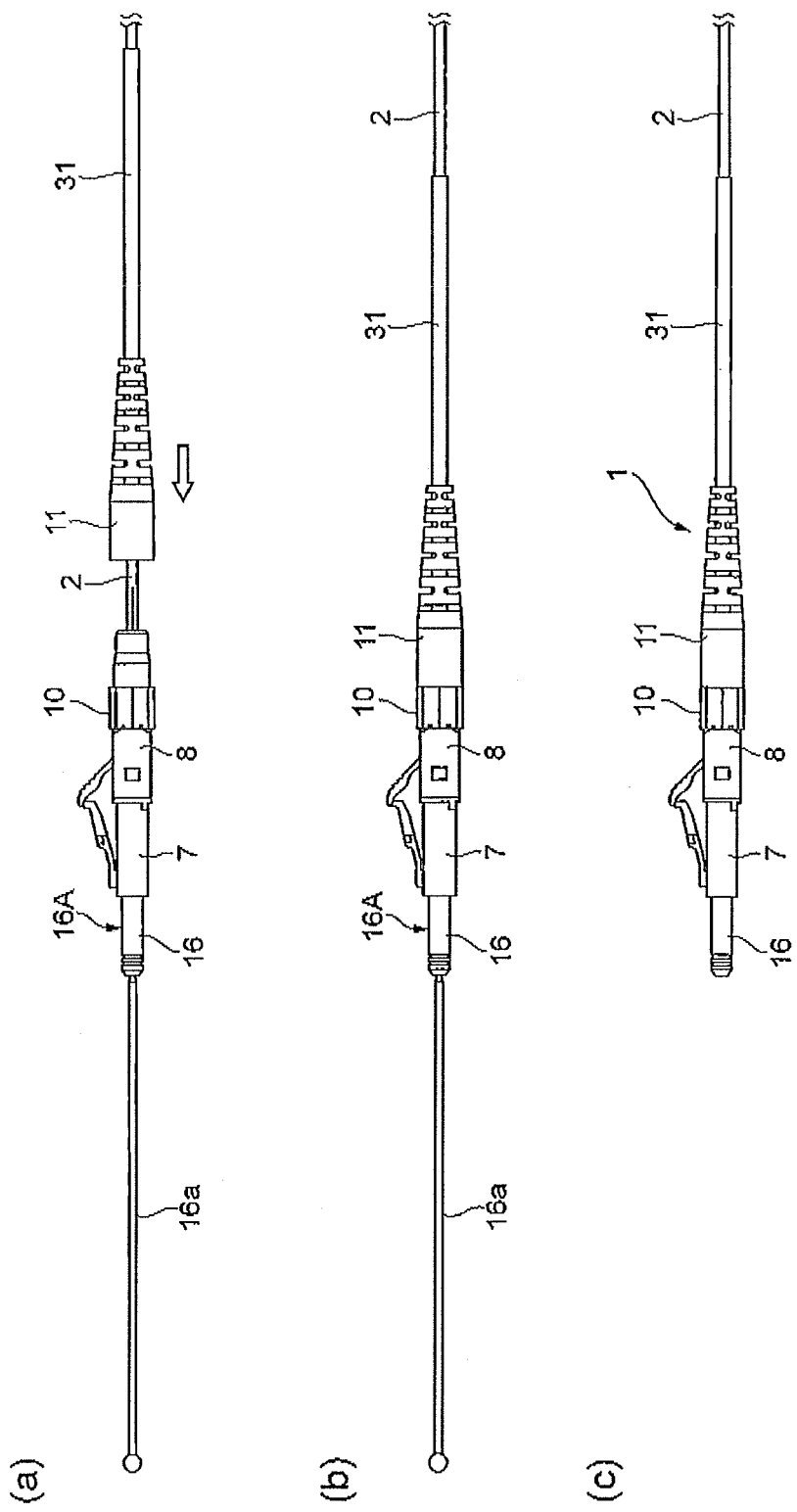
FIG. 14 is a diagram illustrating the procedure of assembling the optical connector depicted in (a) of FIG. 1.

Next, while the tension fiber 5 is mounted on the larger tubular portion 20 of the rear housing 8, the securing member 10 is screwed and mounted onto the larger tubular portion 20 as illustrated in (a) of FIG. 14 (as mentioned above in detail). That is, the securing member 10 is attached to or threadably mounted on the larger tubular portion 20. This secures the sheath 4 and tension fiber 5 to the rear housing 8.

Subsequently, as illustrated in (b) of FIG. 14, the boot 11 having the reinforcement tube 31 attached thereto is mounted to the sheath securing portion 29 of the securing member 10. Then, as illustrated in (c) of FIG. 14, the string 16a of the string-attached dust cap 16A is cut off with fingers. The foregoing completes the optical connector 1 as illustrated in (a) of FIG. 1.

In this embodiment, as in the foregoing, the securing member 10 is screwed on the larger tubular portion 20 of the rear housing 8, i.e., the securing member 10 is attached to or threadably mounted on the larger tubular portion 20 of the rear housing 8, while the sheath pressing member 9 presses the sheath 4 of the optical cord 2 against the smaller tubular portion 21 of the rear housing 8, so that the securing member 10 secures the sheath 4 and tension fiber 5 of the optical cord 2 by holding them with the rear housing 8, whereby the sheath 4 and tension fiber 5 can easily be secured to the rear housing 8 without mechanically crimping caulking rings. Therefore, no caulking tools are necessary, so that, when assembling the optical connector 1 on site out of the factory, it is unnecessary for operators to take the trouble of bringing a caulking tool to the site. Hence, the operators do not have to make sure more than necessary to bring the caulking tool, whereby their burden can be relieved.

Since the sheath securing portion 29 of the securing member 10 is provided with the taper region 29a, each of the pressing arms 26 of the sheath pressing member 9 bends toward the larger tubular portion 20 so as to follow the taper region 29a when the securing member 10 is screwed on the larger tubular portion 20 of the rear housing 8, i.e., when the securing member 10 is attached to or threadably mounted on the larger tubular portion 20, whereby the sheath 4 can be secured to the rear housing 8 sufficiently firmly.

Since the spring 18 is held by the support projections 19 disposed at the front end portion of the rear housing 8, the operators are kept from dropping the spring 18 by mistake during the operation of assembling the optical connector 1. This can spare the operators the trouble of searching for the dropped spring 18.

Figure 15:
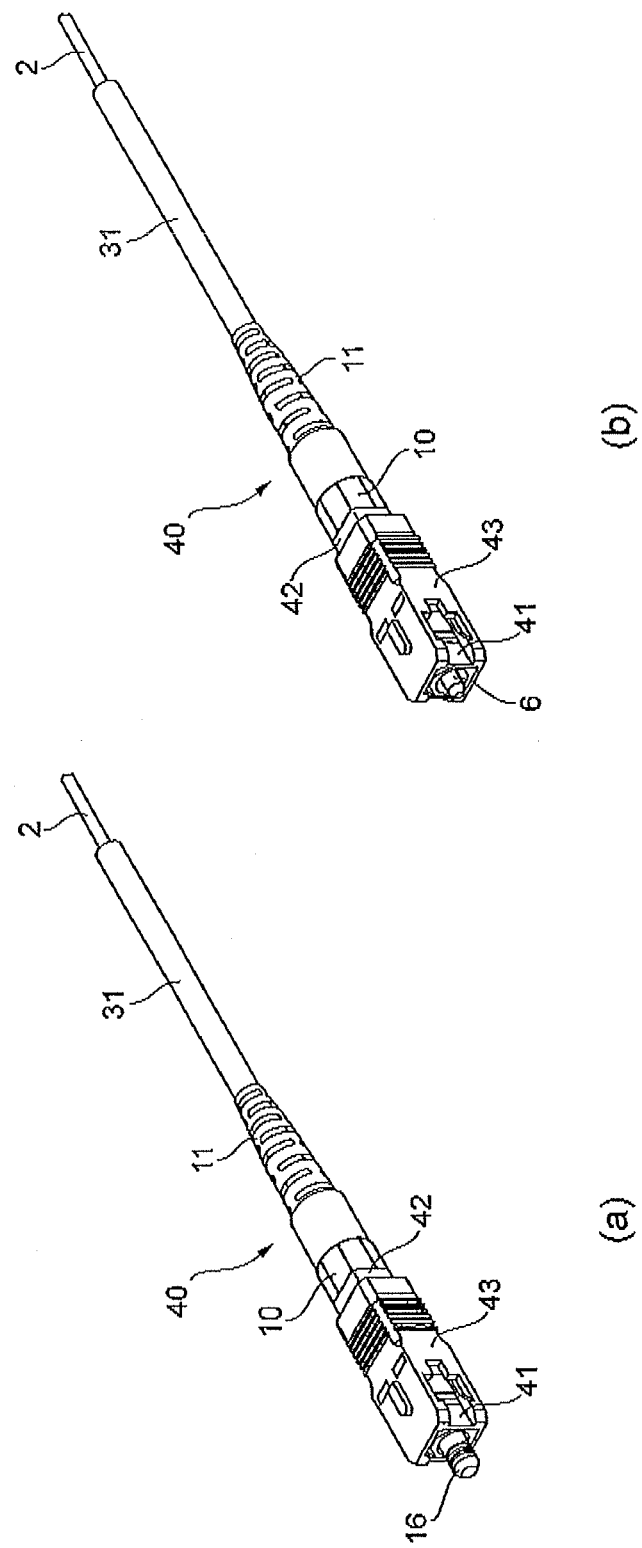
FIG. 15 is a perspective view illustrating another embodiment of the optical connector in accordance with the present invention.
Figure 16:
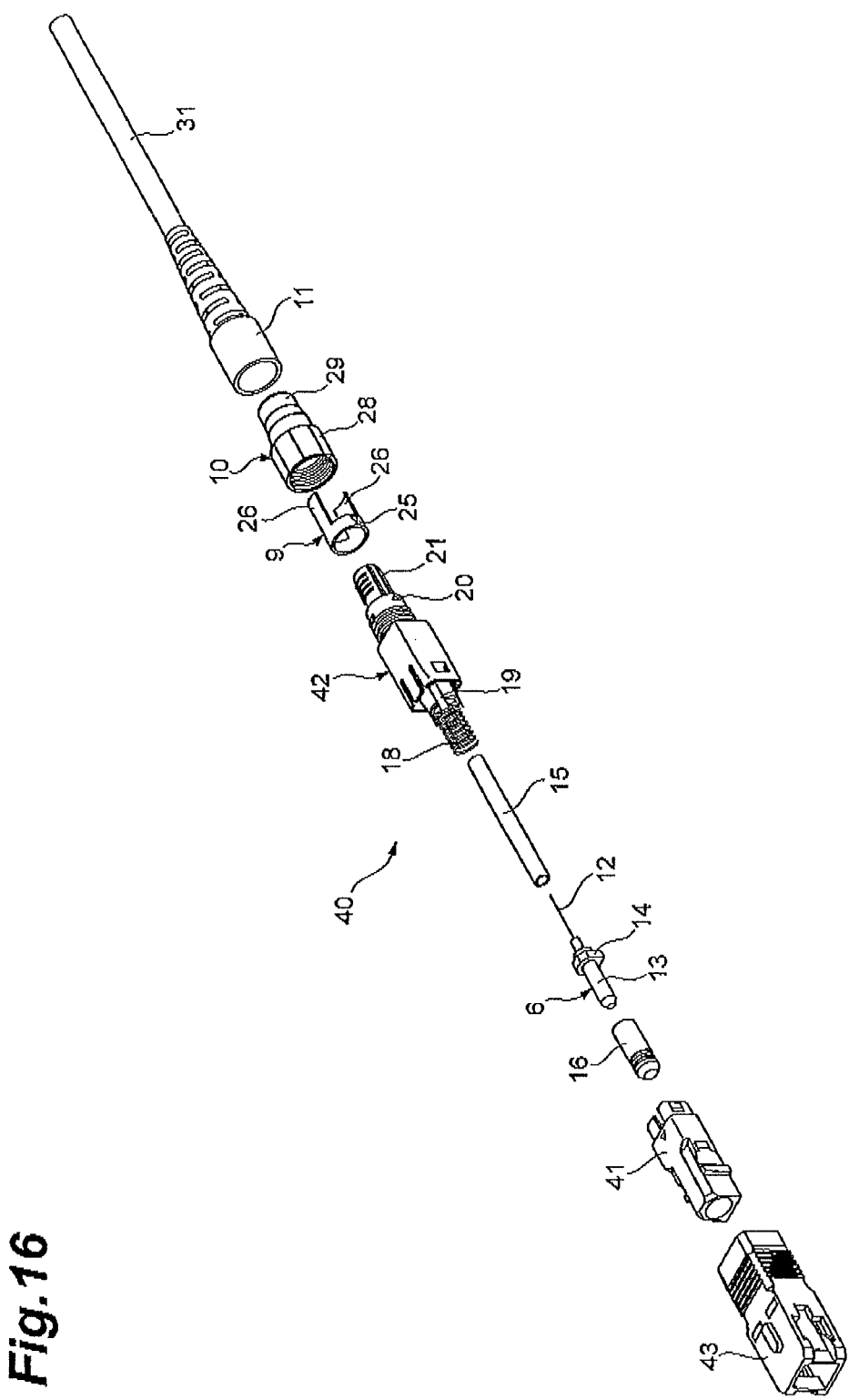
FIG. 16 is an exploded perspective view of the optical connector illustrated in (a) of FIG. 15.
Figure 17:
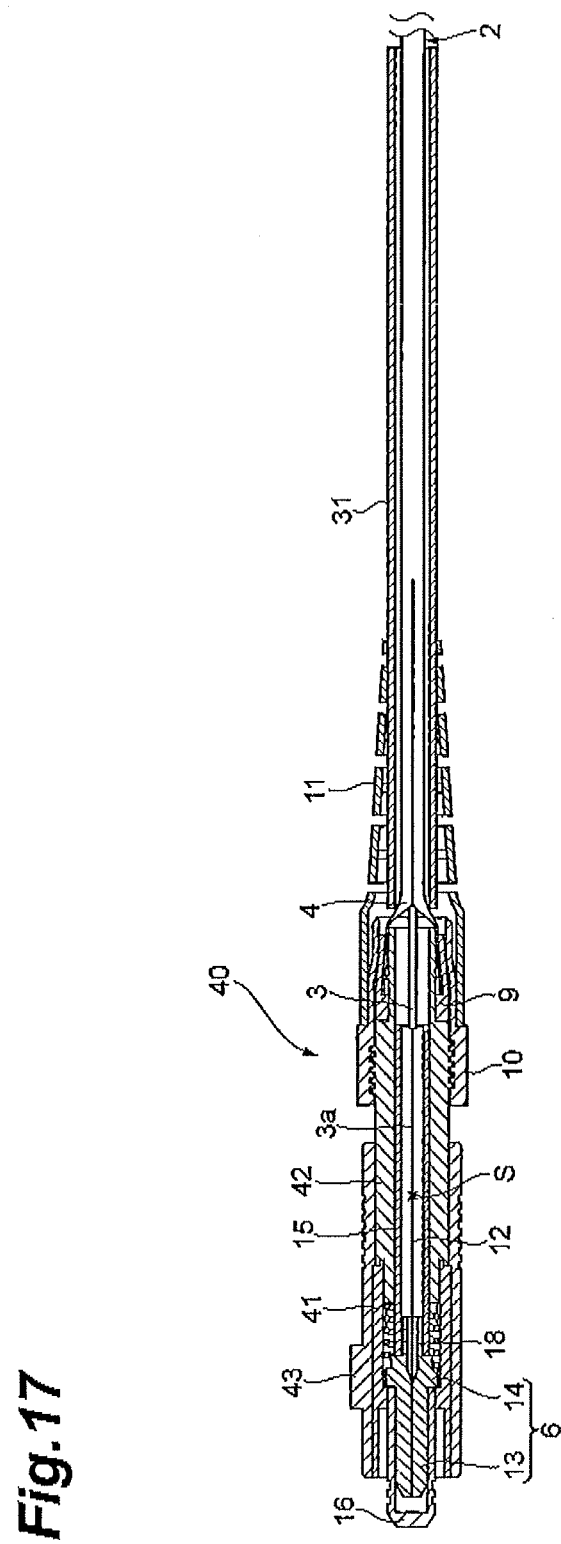
FIG. 17 is a sectional view of the optical connector illustrated in (a) of FIG. 15.

FIG. 15 is a perspective view illustrating another embodiment of the optical connector in accordance with the present invention. In FIG. 15, (a) and (b) illustrate the optical connector in the states with and without a dust cap, respectively. FIGS. 16 and 17 are exploded perspective and sectional views of the optical connector illustrated in (a) of FIG. 15, respectively. In these drawings, members identical or equivalent to those in the preceding embodiment are referred to with the symbols identical thereto. In the following description, the members identical or equivalent to those in the preceding embodiment will not be explained.

The optical connector 40 of the embodiment illustrated in FIGS. 15 to 17 is a fusion-spliced SC connector having an optical cord 2 assembled thereto. The optical connector 40 comprises a plug housing 41 and a rear housing 42 in place of the plug housing 7 and rear housing 8 in the preceding embodiment. The inner structure of the plug housing 41 is substantially the same as that of the plug housing 7. As with the rear housing 8, the rear housing 42 comprises four support projections 19 for supporting a spring 18, a larger tubular portion 20, and a smaller tubular portion 21. The inner structure of the rear housing 42 is substantially the same as that of the rear housing 8. The optical connector 40 further comprises a grip 43 covering the plug housing 41 and rear housing 42.

Figure 18:
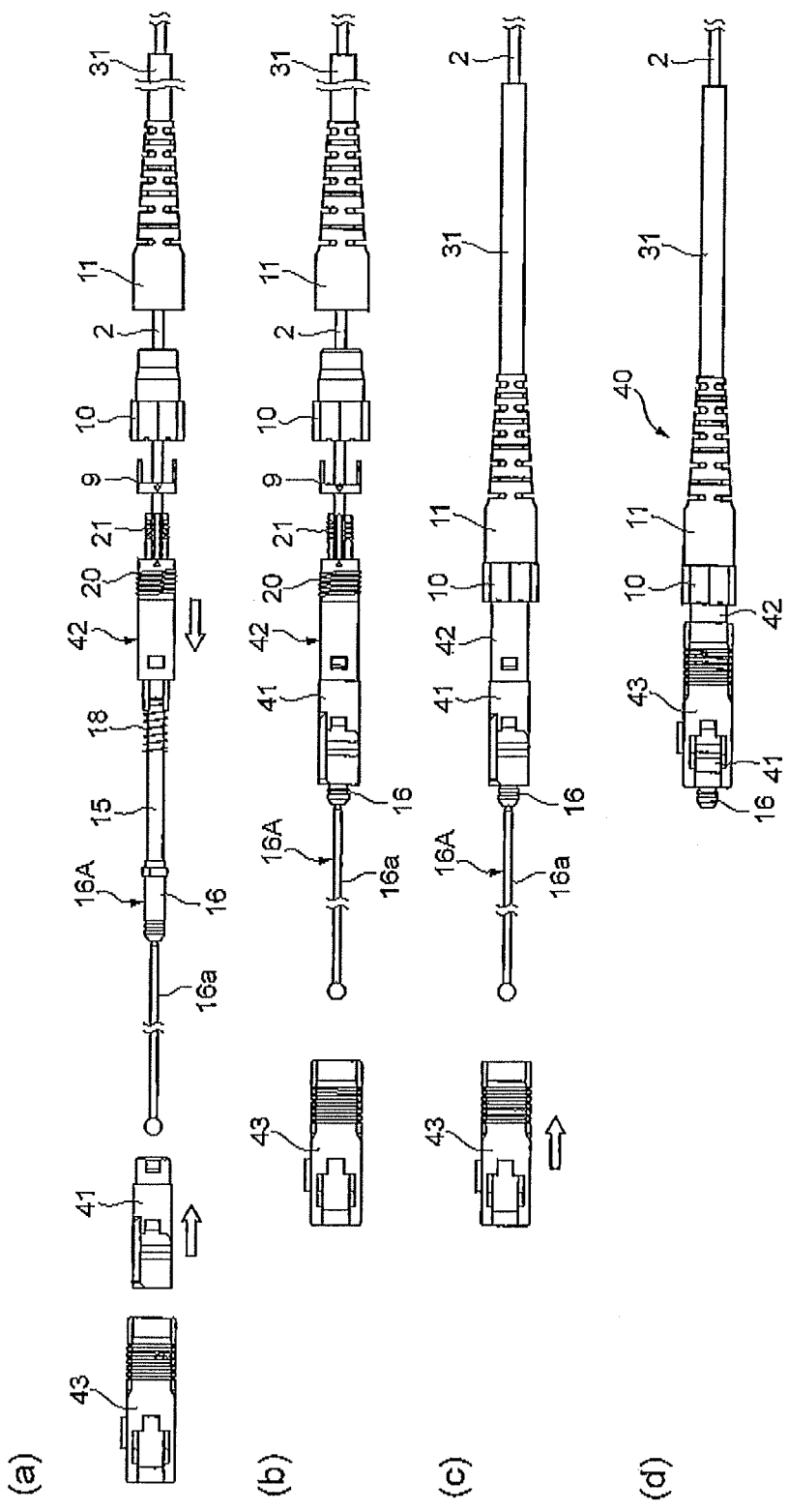
FIG. 18 is a diagram illustrating a procedure of assembling the optical connector depicted in (a) of FIG. 15.

When assembling thus constructed optical connector 40, as illustrated in (a) of FIG. 18, a ferrule body 13 of a ferrule member 6 is covered with a string-attached dust cap 16A, while the optical cord 2 is passed through a boot 11 mounted with a reinforcement tube 31, a securing member 10, a sheath pressing member 9, and the rear housing 42 having the spring 18 attached thereto. Subsequently, in this state, a built-in fiber 12 held by the ferrule member 6 and a coated optical fiber 3 of the optical cord 2 are fusion-spliced to each other as in the preceding embodiment. Then, as illustrated in (b) of FIG. 18, the string-attached dust cap 16A is passed through the plug housing 41 to join the plug housing 41 to the rear housing 42.

Thereafter, as illustrated in (c) of FIG. 18, the sheath 4 and tension fiber 5 (not depicted) of the optical cord 2 are secured to the rear housing 42 by the sheath pressing member 9 and securing member 10, and the boot 11 is mounted to the securing member 10 as in the preceding embodiment. Subsequently, as illustrated in (d) of FIG. 18, the grip 43 is attached to the plug housing 41, and then the string 16a of the string-attached dust cap 16A is cut with fingers. The foregoing completes the optical connector 40 as illustrated in (a) of FIG. 14.

Figure 19:
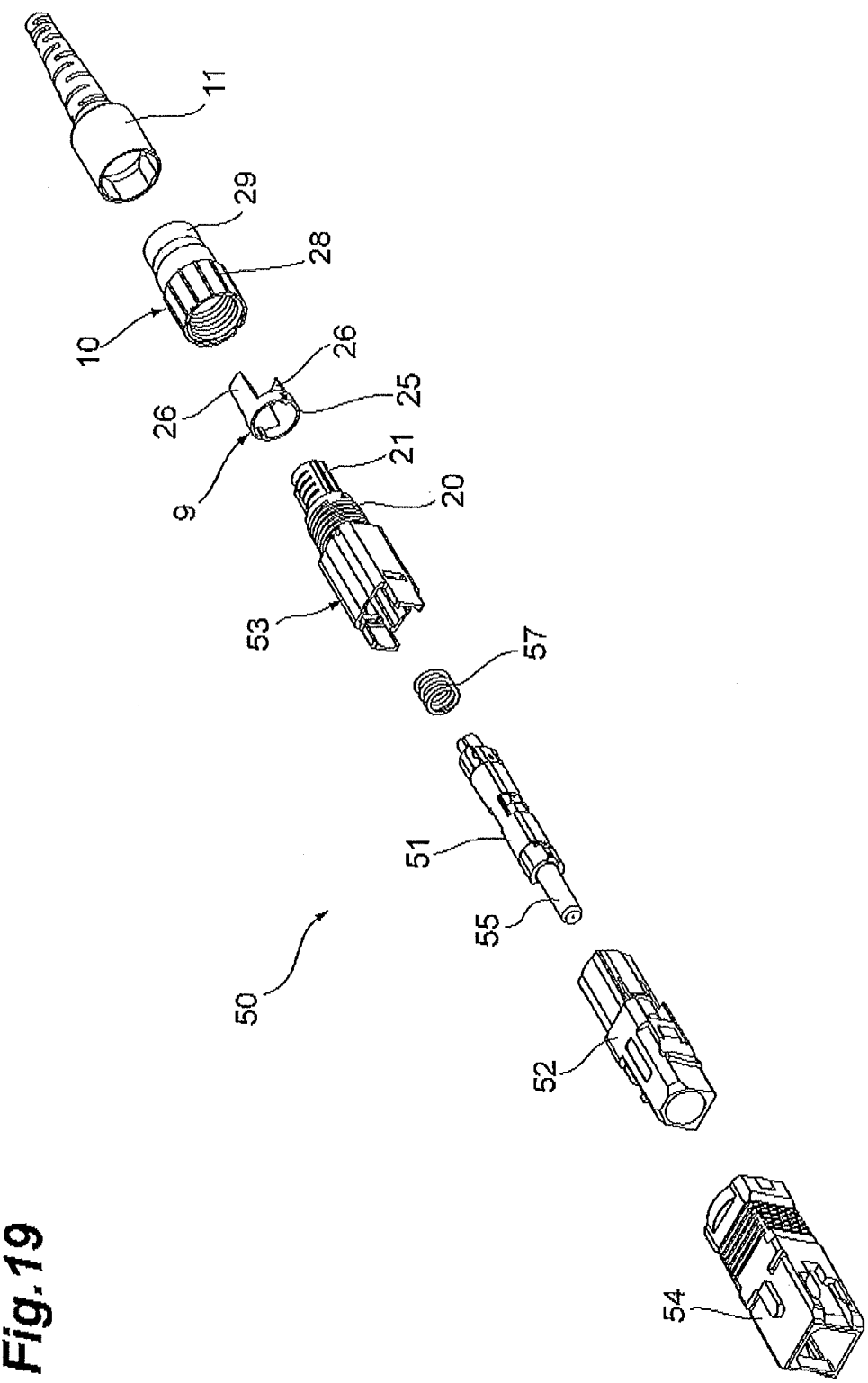
FIG. 19 is an exploded perspective view illustrating still another embodiment of the optical connector in accordance with the present invention.
Figure 20:
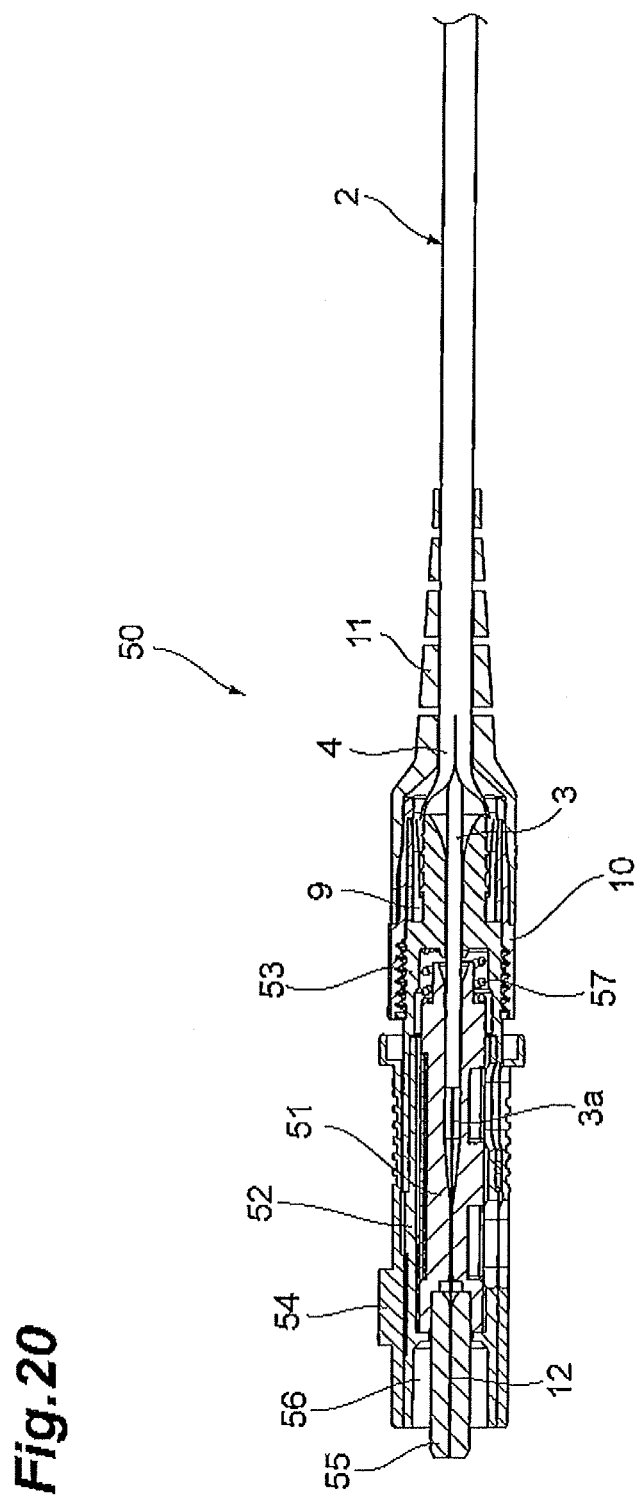
FIG. 20 is a sectional view of the optical connector illustrated in FIG. 19.

FIG. 19 is an exploded perspective view illustrating still another embodiment of the optical connector in accordance with the present invention, while FIG. 20 is a sectional view of the optical connector illustrated in FIG. 19. An these drawings, members identical or equivalent to those in the preceding embodiments are referred to with the symbols identical thereto. In the following description, the members identical or equivalent to those in the preceding embodiments will not be explained.

The optical connector 50 of the embodiment illustrated in FIGS. 19 and 20 is a mechanical splice SC connector having an optical cord 2 assembled thereto. The optical connector 50 comprises a mechanical splice 51, a plug housing 52 for containing the mechanical splice 51, a rear housing 53 arranged behind and joined to the plug housing 52, a grip 54 covering the plug housing 52, and the above-mentioned sheath pressing member 9, securing member 10, and boot 11.

The mechanical splice 51 includes a base part and a pressing part which are openable and closable and a U-shaped clamping spring holding them, which are not depicted in particular. A ferrule 55 holding a short built-in fiber 12 is integrally secured to the front end of the base part of the mechanical splice 51. The mechanical splice 51 mechanically splices the built-in fiber 12 held by the ferrule 55 and a coated optical fiber 3 exposed by removing the sheath 4 from a leading end portion of the optical cord 2. The base and pressing parts of the mechanical splice 51 can be opened by a wedge member 58 (see FIG. 21). The front end portion of the plug housing 52 is formed with a ferrule accommodation space 56 for containing the ferrule 55.

As with the rear housing 42, the rear housing 53 has a larger tubular portion 20 and a smaller tubular portion 21. A spring 57 for forwardly urging the ferrule 55 is arranged between the mechanical splice 51 and rear housing 53.

Figure 21:
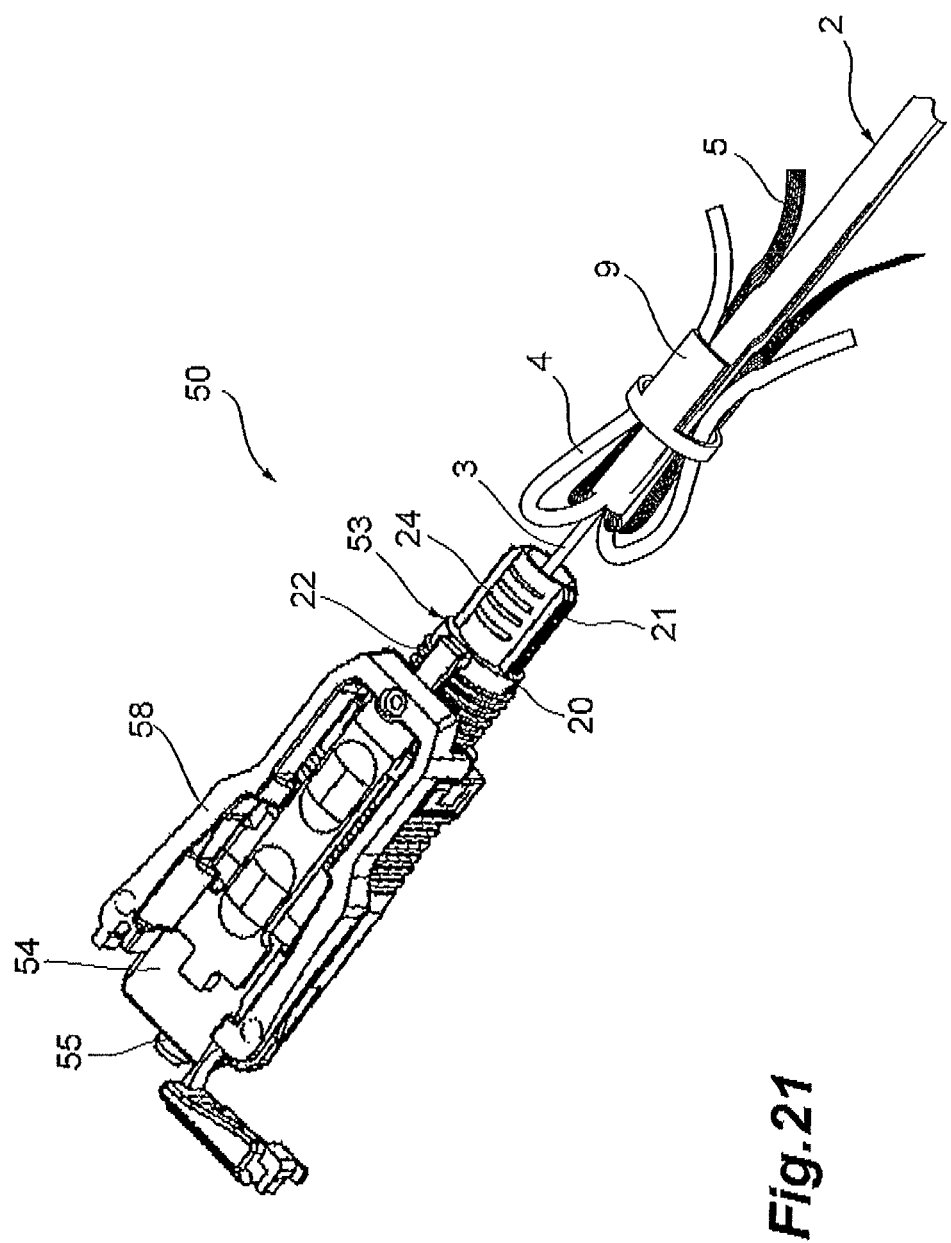
FIG. 21 is a perspective view illustrating a procedure of securing the sheath and tension fiber of an optical cord to the rear housing depicted in FIG. 19.

When assembling thus constructed mechanical splice optical connector 50, the mechanical splice 51, plug housing 52, rear housing 53, and grip 54 are assembled together at first as illustrated in FIG. 21. Subsequently, the wedge member 58 is mounted to the resulting structure, and the wedge part (not depicted) of the wedge member 58 is inserted into the boundary between the base and pressing parts of the mechanical splice 51, so as to open the mechanical splice 51.

While the optical cord 2 is passed through the securing member 10 and sheath pressing member 9, the sheath 4 is removed from the leading end portion of the optical cord 2, so as to expose the coated optical fiber 3 and tension fiber 5, and a leading end portion of the sheath 4 is torn into a bifurcated state. Subsequently, the coating is removed from a leading end portion of the coated optical fiber 3, so as to expose a bare fiber 3a, which is then cleaned, and thereafter a leading end portion of the bare fiber 3a is cut off.

Next, the coated optical fiber 3 is passed through the rear housing 53 from its rear side, so as to be inserted into the mechanical splice 51 and butted against and coupled to the built-in fiber 12 held by the ferrule 55.

Figure 22:
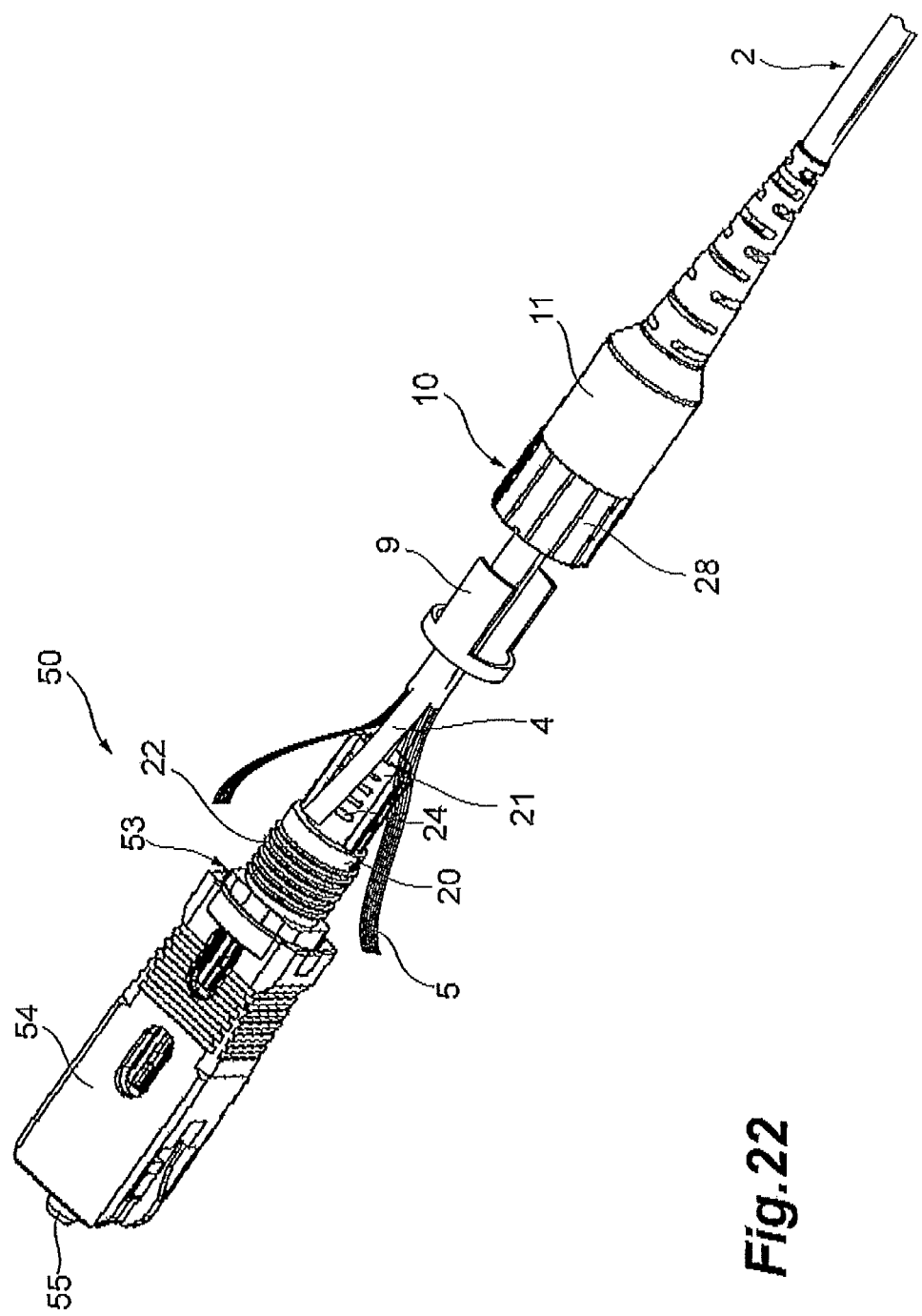
FIG. 22 is a perspective view illustrating the procedure of securing the sheath and tension fiber of the optical cord to the rear housing depicted in FIG. 19.

Subsequently, as illustrated in FIG. 22, the wedge member 58 is removed, so as to pull out the wedge part of the wedge member 58 from the mechanical splice 51. This closes the mechanical splice 51, thereby securing the coated optical fiber 3 and built-in fiber 12 in their coupled state to the mechanical splice 51.

Figure 23:
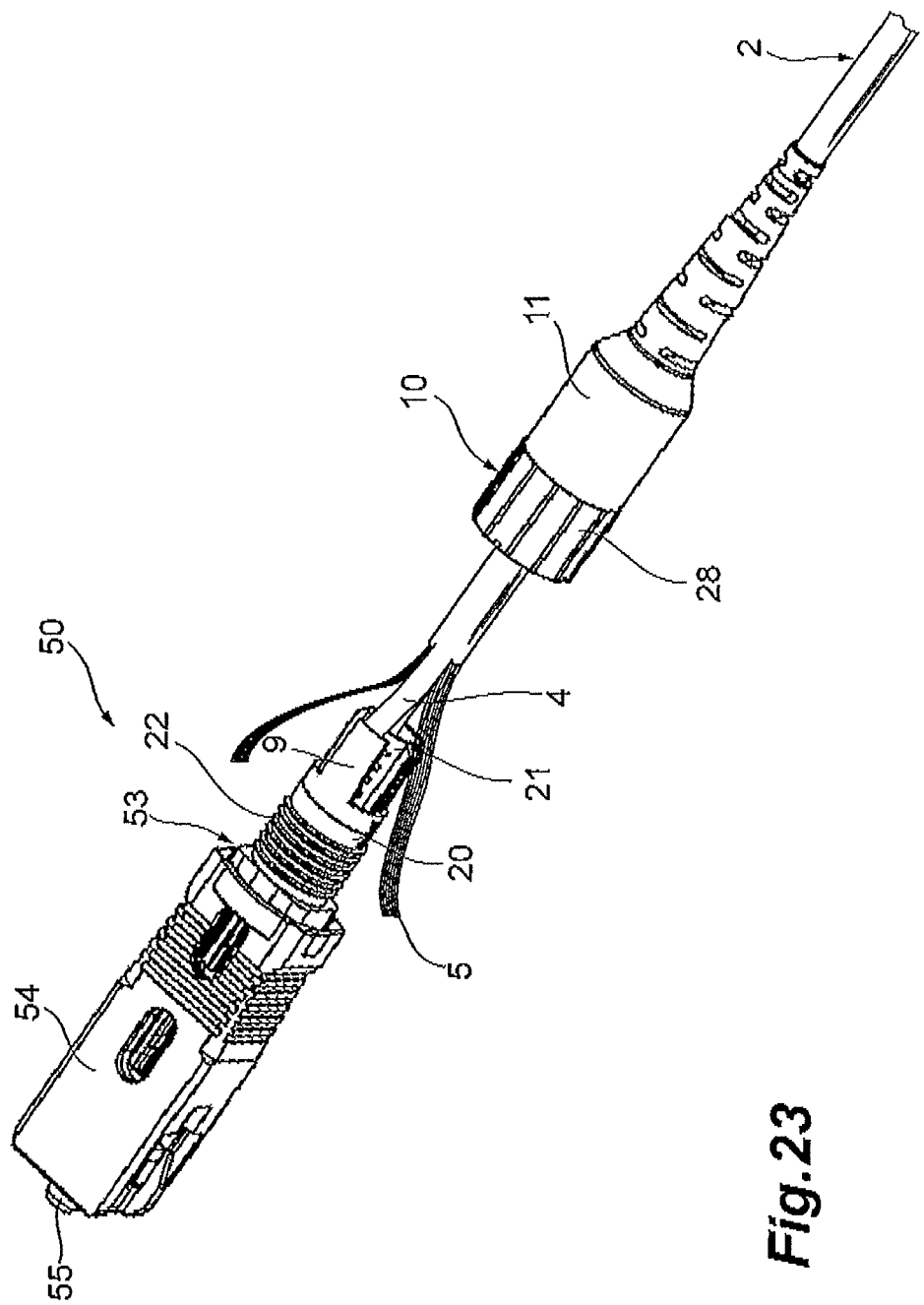
FIG. 23 is a perspective view illustrating the procedure of securing the sheath and tension fiber of the optical cord to the rear housing depicted in FIG. 19.

Next, while the boot 11 is attached to the securing member 10, the sheath 4 in the bifurcated state is mounted on blades 24 of the smaller tubular portion 21 of the rear housing 53. Then, as illustrated in FIG. 23, the sheath pressing member 9 is fitted onto the smaller tubular portion 21, i.e., the sheath pressing member 9 is engaged with the smaller tubular portion 21, so as to temporarily secure the sheath 4 with the sheath pressing member 9.

Figure 24:
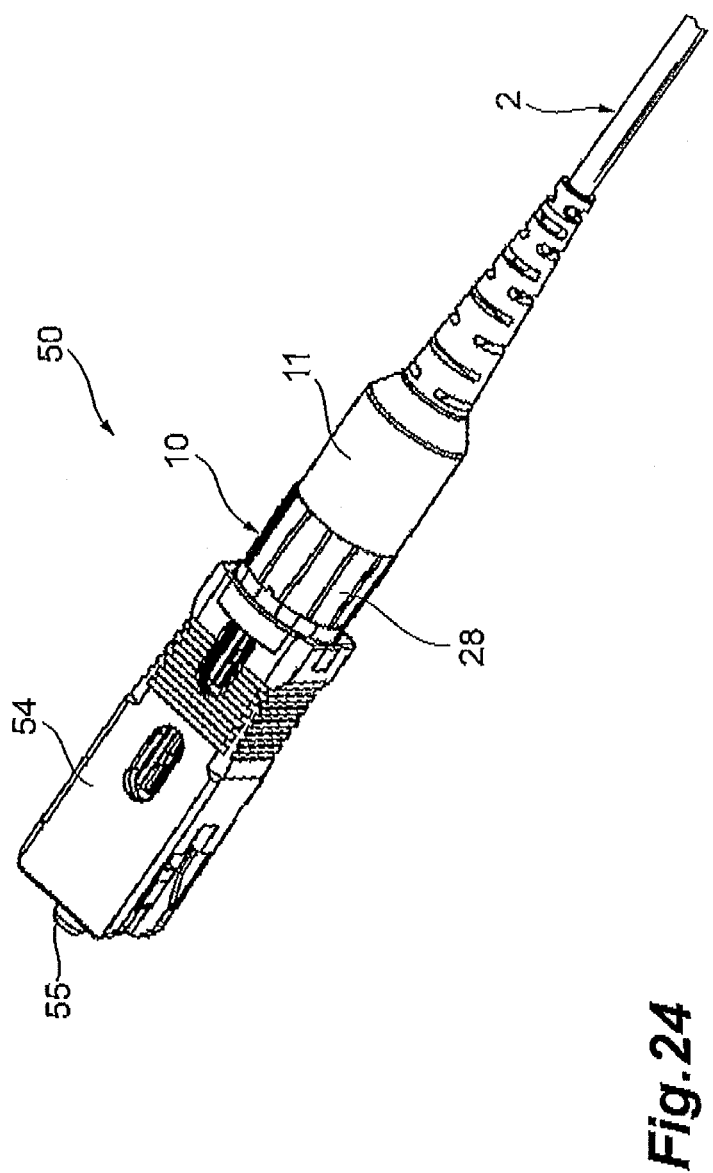
FIG. 24 is a perspective view illustrating the procedure of securing the sheath and tension fiber of the optical cord to the rear housing depicted in FIG. 19.

Subsequently, while the tension fiber 5 of the optical cord 2 is placed on the larger tubular portion 20 of the rear housing 53, the tension fiber securing portion 28 of the securing member 10 mounted with the boot 11 is screwed on the larger tubular portion 20 as illustrated in FIG. 24, i.e., the tension fiber securing portion 28 is attached to or threadably mounted on the larger tubular portion 20, whereby the sheath 4 in the bifurcated state and the tension fiber 5 are secured to the rear housing 53 by the securing member 10. The foregoing completes the mechanical splice optical connector 50.

As in the foregoing, the sheath pressing member 9 and securing member 10 secure the sheath 4 and tension fiber 5 of the optical cord 2 to the rear housing 53 in this embodiment as well, whereby the sheath 4 and tension fiber 5 can easily be secured without mechanically crimping caulking rings.

Though the optical connector 50 of this embodiment is a mechanical splice SC connector having the mechanical splice 51, the above-mentioned LC connector may be turned into a mechanical splice type.

Though some preferred embodiments of the optical connector in accordance with the present invention have been explained in the foregoing, the present invention is not limited to the above-mentioned embodiments. For example, while the above-mentioned embodiments form the male thread 22 on the outer peripheral face of the larger tubular portion 20 in the rear housing 8, 42, 53 and the female thread 30 on the inner peripheral face of the tension fiber securing portion 28 of the securing member 10, the method for mounting the securing member 10 to the larger tubular portion 20 of the rear housing 8, 42, 53 is not limited to screwing in particular.

The flange 14 of the ferrule member 6 exhibits a substantially rectangular shape having cutout faces 14a at two corners in the above-mentioned embodiments, but may have any shape as long as it is vertically asymmetrical. The ferrule accommodation space 17a of the plug housing 7 has a shape corresponding to that of the flange 14 in this case as well.

Reference Signs List

1 . . . optical connector; 2 . . . optical cord; 3 . . . coated optical fiber; 4 . . . sheath; 5 . . . tension fiber; 6 . . . ferrule member (ferrule); 7 . . . plug housing (first housing); 8 . . . rear housing (second housing); 9 . . . sheath pressing member; 10 . . . securing member; 12 . . . built-in fiber; 14 . . . flange; 17a . . . ferrule accommodation space; 18 . . . spring; 19 . . . support projection; 20 . . . larger tubular portion (first tubular portion); 21 . . . smaller tubular portion (second tubular portion); 25 . . . annular portion; 26 . . . pressing arm; 28 . . . tension fiber securing portion; 29 . . . sheath securing portion; 29a . . . taper region; 40 . . . optical connector; 41 . . . plug housing (first housing); 42 . . . rear housing (second housing); 50 . . . optical connector; 51 . . . mechanical splice (fiber-spliced portion); 52 . . . plug housing (first housing); 53 . . . rear housing (second housing); 55 . . . ferrule; 56 . . . ferrule accommodation space; S . . . fusion-spliced portion (fiber-spliced portion)

The invention claimed is:

1. An optical connector having a fiber-spliced portion connecting a built-in fiber held by a ferrule and an optical fiber exposed by removing a sheath of an optical cord to each other, the optical connector comprising:
   a first housing for containing the ferrule and the fiber-spliced portion;
   a second housing arranged behind the first housing;
   a sheath pressing member, mounted to the second housing, for pressing the sheath of the optical cord against the second housing; and
   a securing member, mounted to the second housing so as to contain the sheath pressing member, for securing a tension fiber incorporated in the optical cord to the second housing together with the sheath.

2. The optical connector according to claim 1, wherein the second housing has a first tubular portion and a second tubular portion disposed behind the first tubular portion and having an outer diameter smaller than that of the first tubular portion;
   wherein the sheath pressing member has an annular portion adapted to fit to the second tubular portion and a pair of pressing arms, disposed so as to extend behind the annular portion, for pressing the sheath in a bifurcated state against the second tubular portion; and
   wherein the securing member has a tension fiber securing portion adapted to fit to the first tubular portion so as to hold and secure the tension fiber with the first tubular portion and a sheath securing portion, disposed behind the tension fiber securing portion, for holding and securing the sheath in the bifurcated state with the second tubular portion via the pressing arms.

3. The optical connector according to claim 2, wherein the sheath securing portion has a taper region tapering down to the rear side of the securing member.

4. The optical connector according to claim 1, wherein a front end portion of the second housing is provided with a support projection for supporting at a plurality of locations a spring for forwardly urging the ferrule.

5. The optical connector according to claim 1, wherein the ferrule includes a flange having a vertically asymmetrical shape; and
   wherein a ferrule accommodation space for containing the ferrule in the first housing has a shape corresponding to the flange.

* * * * *